US009256512B1

(12) United States Patent
Shiraishi

(10) Patent No.: US 9,256,512 B1
(45) Date of Patent: Feb. 9, 2016

(54) QUALITY ANALYSIS FOR EMBEDDED SOFTWARE CODE

(71) Applicant: TOYOTA JIDOSHA KABUSHIKI KAISHA, Toyota-shi, Aichi-ken (JP)

(72) Inventor: Shinichi Shiraishi, San Jose, CA (US)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 61 days.

(21) Appl. No.: 14/106,527

(22) Filed: Dec. 13, 2013

(51) Int. Cl.
*G06F 9/44* (2006.01)
*G06F 11/36* (2006.01)

(52) U.S. Cl.
CPC .................................... *G06F 11/362* (2013.01)

(58) Field of Classification Search
CPC ......... G06F 8/73; G06F 8/75; G06F 11/3604; G06F 11/3684
USPC ......................................................... 717/131
See application file for complete search history.

(56) References Cited

U.S. PATENT DOCUMENTS 8,296,741 B1 10/2012 Huang et al.
2003/0005364 A1 1/2003 Chung et al.
2003/0110474 A1 6/2003 Ur et al.
2005/0229044 A1 10/2005 Ball
2006/0184829 A1 8/2006 Cheong et al.
2007/0006194 A1 1/2007 Mejri et al.
2007/0089092 A1* 4/2007 Schmidt et al. ............... 717/126
2008/0244539 A1 10/2008 Rajamani et al.
2009/0259989 A1* 10/2009 Cifuentes et al. ... G06F 11/3604 717/110
2010/0333069 A1 12/2010 Chandra et al.
2011/0088016 A1 4/2011 Ball et al.
2011/0282710 A1 11/2011 Akkiraju et al.
2012/0272220 A1* 10/2012 Calcagno et al. ............. 717/125
2012/0303910 A1 11/2012 Ma
2013/0159964 A1* 6/2013 Szpak ................ G06F 11/3684 717/105
2013/0238940 A1 9/2013 Chalmers et al.
2014/0068564 A1 3/2014 Jain et al.
2014/0123110 A1 5/2014 Wan et al.
2014/0344775 A1 11/2014 Dunne et al.

OTHER PUBLICATIONS

Nagappan, “Preliminary Results on Using Static Analysis Tools for Software Inspection”,Nov. 2014,p. 1-11.*
“Data-flow analysis” from Wikipedia, the free encyclopedia, located at: http://en.wikipedia.org/wiki/Data_flow_analysis#Backward_Analysis, downloaded May 14, 2014 (8 pages).

(Continued)

*Primary Examiner* — Duy Khuong Nguyen
(74) *Attorney, Agent, or Firm* — Patent Law Works LLP

(57) ABSTRACT

The disclosure includes technology for analyzing software code for embedded systems using a plurality of analysis tools. The technology includes an example system including a processor and a memory storing instructions that when executed cause the system to determine a falseness rate for each of two or more analysis tools; analyze software code using the two or more analysis tools to generate two or more tool-output results; generate an analysis result based on the two or more tool-output results, the analysis result characterizing one or more faults and one or more validations identified in the two or more tool-output results; determine a fault expectation for the software code based on the analysis result and the falseness rate of each of the two or more analysis tools; and perform a quality assurance analysis for the software code based on the fault expectation.

17 Claims, 23 Drawing Sheets

(56) References Cited

OTHER PUBLICATIONS

"Static Code Analysis" from OWASP, located at: https://www.owasp.org/index.php/Static_Code_Analysis, downloaded May 14, 2014 (7 pages).

"Static program analysis" from Wikipedia, the free encyclopedia, located at: http://en.wikipedia.org/wiki/Static_program_analysis, downloaded May 14, 2014 (5 pages).

Beyer et al., "The software model checker BLAST Applications to software engineering", Int J Softw Tools Technol Transfer (2007) 9: 505-525 (21 pages).

Nagappan et al., "Static Analysis Tools as Early Indicators of Pre-Release Defect Density," Proceedings of the 27th International Conference on Software Engineering, May 15, 2005 (8 pages).

Holsinger et al., "Prevent Vs FindBugs Application and Evaluation," Mar. 29, 2008 (15 pages).

De Mendonca et al., "Static Analysis Techniques and Tools: A Systematic Mapping Study," The Eighth International Conference on Software Engineering Advances, Oct. 27, 2013 (7 pages).

* cited by examiner

700

```
1: int main(...){
2: c=a/b;
3: }
4: void funcA(...){
5: If(b!=0){c=a/b}
6: }
(snip)
```

| Tools | Likelihood of Red lines: (1- False Positive Rate) | Likelihood of Green Lines: (1- False Negative Rate) |
| --- | --- | --- |
| Tool 1 | $C_R(1)$ | $C_G(1)$ |
| Tool 2 | $C_R(2)$ | $C_G(2)$ |
| ... | ... | ... |
| Tool N | $C_R(N)$ | $C_G(N)$ |

| Example Analysis Tool Performance Statistics | | | | | | | | | | | | | | | | |
|---|---|---|---|---|---|---|---|---|---|---|---|---|---|---|---|---|
| Defect Type | Tool #1 | | Tool #2 | | Tool #3 | | Tool #4 | | Tool #5 | | | | Tool #6 | | | |
| | DR | FPR | DR | FPR | DR | FPR | DR | FPR | DR | FPR | PR | FNR | DR | FPR | PR | FNR |
| Static Memory Defects | 74 | 0 | 97 | 0 | 77 | 0 | 87 | 2 | **100** | 0 | 100 | 0 | 79 | 2 | 94 | 15 |
| Dynamic Memory Defects | 46 | 9 | 75 | 4 | 73 | 6 | 7 | 12 | **86** | 78 | 22 | 12 | 61 | 7 | 84 | 34 |
| Numerical Defects | 42 | 0 | 23 | 0 | 11 | 0 | 67 | 42 | **70** | 11 | 89 | 28 | 11 | 0 | 100 | 70 |
| Resource Management Defects | 89 | 4 | 93 | 4 | 89 | 7 | 7 | 0 | 11 | 0 | 50 | 50 | **96** | 4 | 96 | 4 |
| Pointer-Related Defects | 53 | 0 | 82 | 0 | 82 | 0 | **94** | 0 | 88 | 0 | 82 | 6 | 71 | 0 | 94 | 29 |
| Concurrency Defects | 42 | 0 | **89** | 24 | 11 | 0 | 0 | 0 | 0 | 0 | 53 | 74 | 0 | 0 | 0 | 0 |
| Inappropriate Code | 64 | 4 | **72** | 6 | 53 | 0 | 53 | 17 | 28 | 0 | 87 | 72 | 6 | 0 | 96 | 81 |
| Misc | 50 | 0 | **88** | 18 | 58 | 0 | 58 | 10 | 78 | 0 | 83 | 5 | 35 | 10 | 83 | 35 |

Figure 8A

Static Memory Defects

Dynamic Memory Defects

Numerical Defects

Resource Management Defects

Pointer-Related Defects

Concurrency Defects

Inappropriate Code

Misc. Defects

Best Three Tools in terms of Productivity

| Defect Type | First Best | Second Best | Third Best |
|---|---|---|---|
| Static Memory Defects | Tool #5 | Tool #2 | Tool #4 |
| Dynamic Memory Defects | Tool #2 | Tool #3 | Tool #6 |
| Numerical Defects | Tool #5 | Tool #1 | Tool #4 |
| Resource Management Defects | Tool #6 | Tool #2 | Tool #1 |
| Pointer-Related Defects | Tool #4 | Tool #5 | Tool #2 |
| Concurrency Defects | Tool #2 | Tool #1 | Tool #3 |
| Inappropriate Code | Tool #2 | Tool #1 | Tool #3 |
| Misc | Tool #5 | Tool #2 | Tool #3 |
| Average | Tool #2 | Tool #5 | Tool #1 |

Figure 10

Best Tool from Confidence Viewpoint

| Defect Type | First Best |
|---|---|
| Static Memory Defects | Tool #5 |
| Dynamic Memory Defects | Tool #6 |
| Numerical Defects | Tool #5 |
| Resource Management Defects | Tool #6 |
| Pointer-Related Defects | Tool #5 |
| Concurrency Defects | Tool #5 |
| Inappropriate Code | Tool #5 |
| Misc | Tool #5 |

Figure 11

Price List of Tools

| | Tool #1 | Tool #2 | Tool #3 | Tool #4 | Tool #5 | Tool #6 |
|---|---|---|---|---|---|---|
| Condition | 1-Year license, 300 K LOC, and 5 users | Permanent, 500 K LOC, and 1 user | 1-Year license, 2 users | 1-Year license, 5 users | 1 Fixed machine | 1 Fixed machine |
| Price (K USD) | 21 | 34 | 24 | 16.5 | 13 | 22.5 |

Figure 13

Ranking in terms of Efficiency

| Ranking | Efficiency | Tool |
|---|---|---|
| 1st | 1.09 | Tool #5 |
| 2nd | 0.47 | Tool #2 |
| 3rd | 0.43 | Tool #1 |
| 4th | 0.30 | Tool #3 |
| 5th | -0.05 | Tool #4 |
| 6th | -0.22 | Tool #6 |

Figure 14

Defect List of Test Suites

| Defect Type | Subtype | # of Subtypes | # of Cases in Total | |
|---|---|---|---|---|
| | | | w/ Defects | w/o Defects |
| Static Memory Defects | Static buffer overrun, etc. | 2 | 62 | 62 |
| Dynamic Memory Defects | Dynamic buffer overrun, etc. | 6 | 85 | 85 |
| Numerical Defects | Division by zero, data overflow, etc. | 7 | 132 | 115 |
| Resource Management Defects | Double free, etc. | 3 | 28 | 28 |
| Pointer-related Defects | NULL pointer dereference, etc. | 3 | 17 | 17 |
| Concurrency Defects | Dead lock, live lock, etc. | 5 | 19 | 17 |
| Inappropriate Code | Dead code, etc. | 5 | 47 | 47 |
| Misc | Miscellaneous, unintentional infinite loop, etc. | 8 | 40 | 40 |
| **Subtotal** | | 39 | 430 | 411 |
| **Total** | | 39 | 841 | |

Figure 15

Evaluation Criteria of Test Suite Analysis Results

| Test Suites | Analysis Result | True or False | Evaluation Criteria | Acronym |
|---|---|---|---|---|
| w/ Defects | Detected as Unsafe (Positive) | True | Detection Rate | *DR* |
| | Detected as Safe (Negative) | False | False Negative Rate | *FNR* |
| w/o Defects | Detected as Unsafe (Positive) | False | False Positive Rate | *FPR* |
| | Detected as Safe (Negative) | True | Proven Rate | *PR* |

Figure 16

QUALITY ANALYSIS FOR EMBEDDED SOFTWARE CODE

BACKGROUND

The specification relates to performing quality assurance analysis on software code.

Identifying bugs that exist in source code can often be a difficult task, particularly when dealing with application-specific bugs that violate the specification of the software. One approach to find such bugs is to use runtime observation technology. However, this approach is often unworkable in embedded system development because the execution platform (e.g., target hardware or emulator) may not be in existence or mature enough serve as a reliable debugging platform, particularly in early phase of development.

In addition, even though various static analysis tools exist that can detect potential faults existing in software code during the implementation (e.g., early development) phase, these tools can often produce incorrect detection results, such as false positive results and/or false negative results.

SUMMARY

According to one innovative aspect of the subject matter described in this disclosure, a system for analyzing software code for embedded systems using a plurality of analysis tools includes a processor and a memory storing instructions that, when executed, cause the system to determine a falseness rate for each of two or more analysis tools; analyze software code using the two or more analysis tools to generate two or more tool-output results, the two or more tool-output results including one or more faults and one or more validations identified by at least one of the two or more analysis tools; generate an analysis result based on the two or more tool-output results, the analysis result characterizing the one or more faults and the one or more validations identified by at least one of the two or more analysis tools; determine a fault expectation for the software code based on the analysis result and the falseness rate of each of the two or more analysis tools; and perform a quality assurance analysis for the software code based on the fault expectation.

In general, another innovative aspect of the subject matter described in this disclosure may be embodied in methods that include determining a falseness rate for each of two or more analysis tools; analyzing software code using the two or more analysis tools to generate two or more tool-output results, the two or more tool-output results including one or more faults and one or more validations identified by at least one of the two or more analysis tools; generating an analysis result based on the two or more tool-output results, the analysis result characterizing the one or more faults and the one or more validations identified by at least one of the two or more analysis tools; determining a fault expectation for the software code based on the analysis result and the falseness rate of each of the two or more analysis tools; and performing a quality assurance analysis for the software code based on the fault expectation.

Other aspects include corresponding methods, systems, apparatus, and computer program products for these and other innovative aspects.

These and other implementations may each optionally include one or more of the following features. For instance, the features include each falseness rate including a false positive rate and a false negative rate; the fault expectation including an expectation of a number of faults; the fault expectation including an expectation of a fault density; identifying, from the two or more analysis tools and the two or more tool-output results, a first set of tools that each identify at least one of the faults in a line of code included in the software code; identifying, from the two or more analysis tools and the two or more tool-output results, a second set of tools that each validate the line of code as fault-free; determining a number of faults identified in the line of code; determining a number of tools included in the first set of tools; determining a number of tools included in the second set of tools; the analysis result including the number of faults in the line of code, the number of tools included in the first set of tools, and the number of tools included in the second set of tools; determining a number of lines in a code module included in the software code; determining a number of faults identified by the two or more analysis tools for the code module from the two or more tool-output results; identifying, from the two or more analysis tools and the two or more tool-output results, a number of analysis tools that each identify at least one of the faults; identifying, from the two or more analysis tools and the two or more tool-output results, a number of analysis tools that each validate the code module to be fault-free; the analysis result including the number of lines included in the code module, the number of faults identified by the two or more analysis tools for the code module, the number of analysis tools that each identify at least one of the faults, and the number of analysis tools that each validate the code module to be fault-free; and determining the fault expectation and performing quality assurance analysis for the software code being performed in an implementation phase of software development.

The disclosure is particularly advantageous in a number of respects. For example, the technology described herein can estimate the number of faults existing in software code under development in the implementation phase. The technology can estimate the number of faults using multiple analysis tools and monitor the software quality in the implementation phase based on the number of estimated faults. Thus, the technology can perform quality assurance tasks even in the implementation phase.

The technology described herein can efficiently discover and reduce faults during the implementation phase. Comparing to correcting the faults in the test phase, the fault correction performed in an earlier phase such as the implementation phase can reduce the rework cost. The technology can also estimate a fault density for a component such as a code module and analyze the reliability of the software architecture in the design phase. Using the analysis of the fault density, the technology can allow a user to revise the software architecture design before the test phase. It should be understood that the foregoing advantages are provided by way of example and the technology may have numerous other advantages and benefits.

BRIEF DESCRIPTION OF THE DRAWINGS

The disclosure is illustrated by way of example, and not by way of limitation in the figures of the accompanying drawings in which like reference numerals are used to refer to similar elements.

FIG. 7A is a graphic representation illustrating example software code.

FIG. 7B is a graphic representation illustrating example likelihoods related to falseness rates for a plurality of analysis tools.

FIGS. 8A-8C are data representations related to example analysis tool performance statistics.

FIGS. 10-11 are tables providing example analysis tool productivity and confidence statistics.

FIGS. 13-14 are tables providing example analysis tool efficiency statistics.

FIGS. 15 and 16 are tables listing example defect types and evaluation criteria.

DETAILED DESCRIPTION

Overview

Figure 1:
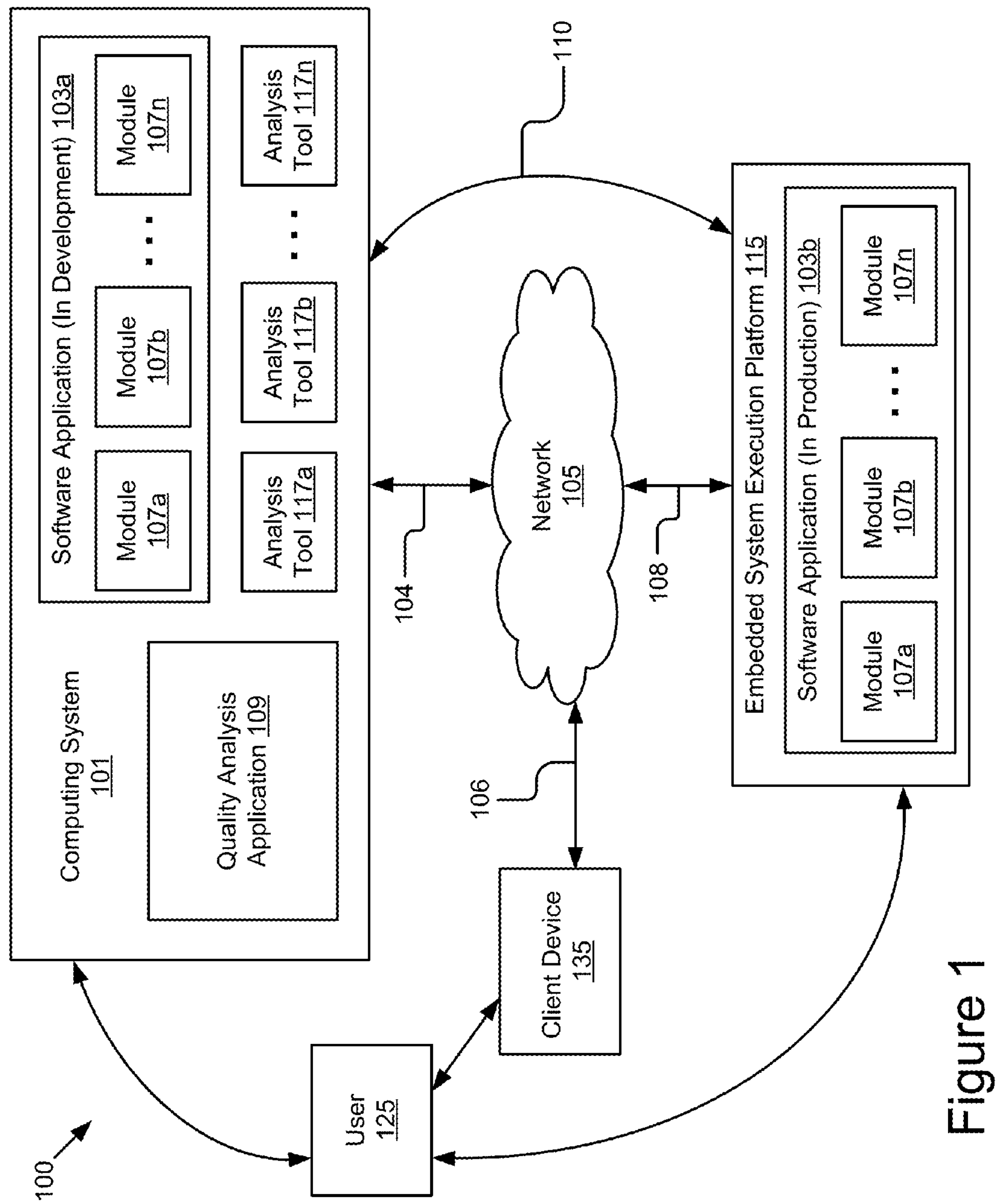
FIG. 1 is a block diagram illustrating an example system for analyzing software code for embedded systems using a plurality of analysis tools.

FIG. 1 illustrates a block diagram of an example system 100 for analyzing software code for embedded systems using a plurality of analysis tools according to some embodiments. The illustrated system 100 includes a computing system 101, a client device 135, and an embedded system execution platform 115. In some embodiments, the entities of the system 100 are communicatively coupled via a network 105. In some additional embodiments, the computing system 101 is communicatively coupled to the embedded system execution platform 115 via signal line 110.

The network 105 can be a conventional type, wired or wireless, and may have numerous different configurations including a star configuration, token ring configuration, or other configurations. Furthermore, the network 105 may include one or more local area networks (LAN), wide area networks (WAN) (e.g., the Internet), public networks, private networks, virtual networks, and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the computing system 101, the client device 135 and the embedded system execution platform 115, in practice one or more networks 105 can be connected to these entities.

The computing system 101 can be a computing device that may include a memory and a processor, for example a laptop computer, a desktop computer, a workstation, a server, a tablet computer, a mobile telephone, a personal digital assistant (PDA), a mobile email device or any other electronic device capable of processing information and accessing a network 105. The computing system 101 is connected to the network 105 via signal line 104. In some embodiments, the computing system 101 can send and receive data to and from the embedded system execution platform 115 and/or the client device 135. For example, the computing system 101 can download the software application 103 to the embedded system execution platform 115, causing the embedded system execution platform 115 to execute the software application 103. The user 125 can interact with the computing system 101. Although FIG. 1 illustrates one computing system 101, the system 100 can include one or more computing systems 101. The computing system 101 can include a quality analysis application 109, a software application 103*a* in development and analysis tools 117*a*, 117*b*, . . . 117*n*.

The quality analysis application 109 can include logic for analyzing quality of software code using a plurality of analysis tools 117. In some embodiments, the quality analysis application 109 can be implemented using software executable by one or more processors of one or more computer devices. In some embodiments, the quality analysis application 109 may be stored in and distributed across a combination of the devices and servers, or in one of the devices or servers. The quality analysis application 109 is described below in more detail with reference to at least FIGS. 2-6.

The software application 103*a* can include in-development software code for embedded systems. For example, the software application 103*a* can be an embedded software application that is being developed and is not yet ready for formal release. In some embodiments, the software application 103*a* can include a plurality of code modules 107*a*, 107*b* . . . 107*n*. Each code module 107*a*, 107*b* . . . 107*n* may implement one or more functions for the software application 103*a*. In some embodiments, the software application 103*a* can include software code with multiple lines of code. The software application 103*a* can be analyzed by the quality analysis application 109 as described herein to determine a quality of the software application 103*a*.

The analysis tools 117*a*, 117*b* . . . 117*n* (also collectively and/or individually referred to herein as 117) can be tools for analyzing software source code without executing the software source code. For example, the analysis tools 117*a*, 117*b* . . . 117*n* can be static analysis tools. In some embodiments, one or more of the analysis tools 117*a* . . . 117*n* may be stand-alone analysis tools. In some embodiments, the quality analysis application 109 may be extensible and one or more of the analysis tools 117*a* . . . 117*n* may be plug-ins that can integrate with and extend the debugging functionality of the quality analysis application 109. Other variations are also possible. In some embodiments, the analysis tools 117 can analyze software source code using various different methods to identify faults (errors, bugs, etc.) in the software source code. For example, an analysis tool 117 can identify lines of code that may have faults using mark-up. For example, the analysis tool 117 can mark these lines of code in red color (referred to as faulty lines or red lines). In further examples, the analysis tool 117 can generate a summary of the faults and provide the summary as an output. In some embodiments, the analysis tools 117 can analyze software source code to identify validations in the software source code. For example, an analysis tool 117 can identify lines of code that may not have faults, and mark these lines of code in green color (also referred to as fault-free lines or green lines). In some embodiments, the analysis tools 117 can identify lines of code that cannot be analyzed by the analysis tools 117 and annotate those lines accordingly. In some cases, an analysis tool 117 can mark these lines of code in black color (referred to as black lines).

In some embodiments, analysis tools 117 can be classified into two classifications: Absence-agnostic static analysis tools and absence-validating semantics-based static analysis tools. Absence-agnostic static analysis tools can find the various types of faults in codebases that can lead to exceptions at runtime. Absence-validating analysis tools can not only find these faults but also prove the absence of these types of faults.

In some embodiments, some of the faulty lines (e.g., red lines) identified by the analysis tools 117 may actually have faults. However, some of the identified faulty lines (e.g., red lines) may not have faults at all, and may be false positive results detected incorrectly by the analysis tools 117. In some embodiments, some of the fault-free lines (e.g., green lines) identified by the analysis tools 117 may actually be fault free. However, some of the identified fault-free lines (e.g., green lines) may actually have faults, and may be false negative results generated incorrectly by the analysis tools 117.

In some embodiments, the analysis tools 117 can analyze software code to generate a tool-output result that can include faulty lines (e.g., red lines), fault-free lines (e.g., green lines), and lines of code that cannot be analyzed (e.g., black lines). Example analysis tools 117 of this variant can include, but are not limited to, MathWorks PolySpace, AbsInt Astree, etc. In some embodiments, the analysis tools 117 may analyze software code to generate a tool-output result that can include faulty lines (e.g., red lines), where all the other lines of code can be marked in black color (e.g., black lines). Some analysis tools 117 do not, in some cases, distinguish fault-free lines from those lines of code that cannot be analyzed, and therefore typically do not generate green lines of code. Example analysis tools 117 of this variant can include, but are not limited to, Klocwork Insight, Coverity, etc. Other example analysis tools 117 are possible. In some embodiments, one or more of the analysis tools 117*a* . . . 117*n* may be stand-alone analysis tools. In some embodiments, the quality analysis application 109 may be extensible and one or more of the analysis tools 117*a* . . . 117*n* may be plug-ins that can integrate with and extend the debugging functionality of the quality analysis application 109. Other variations are also possible. The analysis tools 117 may generate and provide tool-output results describing the analysis performed by them. The results may be provided for visual presentation or as data to another component of the system 100, such as the quality analysis application 109, for further processing. The quality analysis application 109 may be coupled to the analysis tools 117 to receive the tool-output results.

In many cases, regardless of the analysis tool being used, one or more false positive or false negative results may be returned by the analysis tools 117 during the analysis of a given set of code, which can make it difficult to reliably determine whether the code is fault-free. For instance, in some embodiments, some of the faulty lines or red lines identified by the analysis tools may actually have faults and the analysis tools 117 can generate correct detection results for these lines of code. However, some of the identified faulty lines or red lines may not have faults at all, and are false positive results detected incorrectly by the analysis tools 117. In addition, some of the fault-free lines or green lines identified by the analysis tools may actually be fault free and the analysis tools 117 can generate correct detection results for these lines of code. However, some of the identified fault-free lines or green lines may actually have faults, and are false negative results generated incorrectly by the analysis tools 117. Additional acts, structure, and/or functionality of the analysis tools 117 are discussed in further detail elsewhere herein.

In some embodiments, the software code can include one or more code modules 107 and/or one or more lines of code. A line of code can include one or more characters followed by an end of line marker (e.g., carriage return, next line, line feed, etc.), and a tool-output result produced by one analysis tool 117 for the line of code can validate or invalidate (e.g., find fault with) the line of code based on its content. For example, the tool-output result may validate or invalidate the line of code based on the one or more characters used, the sequence and/or placement of the character(s), the value(s) of the character(s), the absence of one or more required characters, the one or more functions represented by the character(s), other code incorporated by reference by the character(s), etc. For example, with reference to FIG. 7A, an example segment of code 700 includes five individual lines of code. The line 702 includes an equation that can be analyzed and the line 704 includes a function that can be analyzed. In some cases, a line of code like line 704, which may include one or more functions, may require the analysis of a body of code describing the function(s). In this case, the tool-output result for that line of code can include the tool-output results for the entire body of code forming the function or portions thereof.

The embedded system execution platform 115 can be a platform for implementing and executing embedded software code, such as the software application 103*a*. The embedded system execution platform 115 may include hardware, software, or a combination of the foregoing. In some embodiments, the embedded system execution platform 115 may include a hardware device that can execute embedded software code, a hardware and/or software emulator for executing embedded software code, etc. Examples of an embedded system execution platform 115 may include, but are not limited to, an informatics system, a voice recognition system, an infotainment system, a tire pressure monitoring system, an adaptive cruise control system, a collision warning system, a night vision and lane warning system, or any other embedded system installed in a vehicle. It should be understood that while some examples and embodiments are described herein in the context of embedded systems and software in vehicles, this technology is applicable to any other embedded systems and/or software. As depicted, the embedded system execution platform 115 is communicatively coupled to the network 105 via signal line 108. The software application 103*a* can be downloaded from the computing system 101 to the embedded system execution platform 115 for execution and can be stored as in-production software application 103*b*. The in-production software application 103*b* can include a plurality of code modules 107*a*, 107*b* . . . 107*n*. The software application 103*a* is similar to the software application 103*b*. The difference between the software application 103*a* and the software application 103*b* can include that the software application 103*a* is at an in-development stage of software development while the software application 103*b* is at an in-production stage of software development. During a software update, or an initial deployment, the in-development software application 103*a* may be deemed production ready after quality analysis has been performed, and may then be downloaded to the embedded system execution platform 115 for deployment as the in-production software application 103*b*. The embedded system execution platform 115 can execute the software application 103*b* and generate an execution result accordingly. In some embodiments, the in-production software application 103 can be software being tested in a test phase. In some embodiments, the in-production software application 103 can be software in a beta version. In some embodiments, the in-production software application 103 can be released software.

The client device 135 can be a computing device that includes a memory and a processor, for example a laptop computer, a desktop computer, a tablet computer, a mobile telephone, a personal digital assistant (PDA), a mobile email device or any other electronic device capable of processing information and accessing a network 105. The client device 135 is communicatively coupled to the network 105 via signal line 106. In some embodiments, the user 125 can interact with the client device 135. In some embodiments, the client device 135 can send and receive data to and from one or more of the computing system 101 and the embedded system execution platform 115, etc. For example, the client device 135 can receive data describing a total number of estimated faults in software code from the quality analysis application 109 and present the total number of estimated faults to the user 125 via a user interface. Although FIG. 1 illustrates one client device 135, the system 100 can include one or more client devices 135.

In some embodiments, the computing system 101 can be a workstation, where the user 125 can operate on the computing system 101 directly. The quality analysis application 109 can run natively on the computing system 101. In some embodiments, the user 125 can use a client device 135 to remotely access the computing system 101, and the quality analysis application 109 can return a quality analysis result related to software code from the computing system 101 to the client device 135 via the network 105, causing the client device 135 to present the quality analysis result on a display device coupled to the client device 135.

Example Quality Analysis Application

Figure 2:
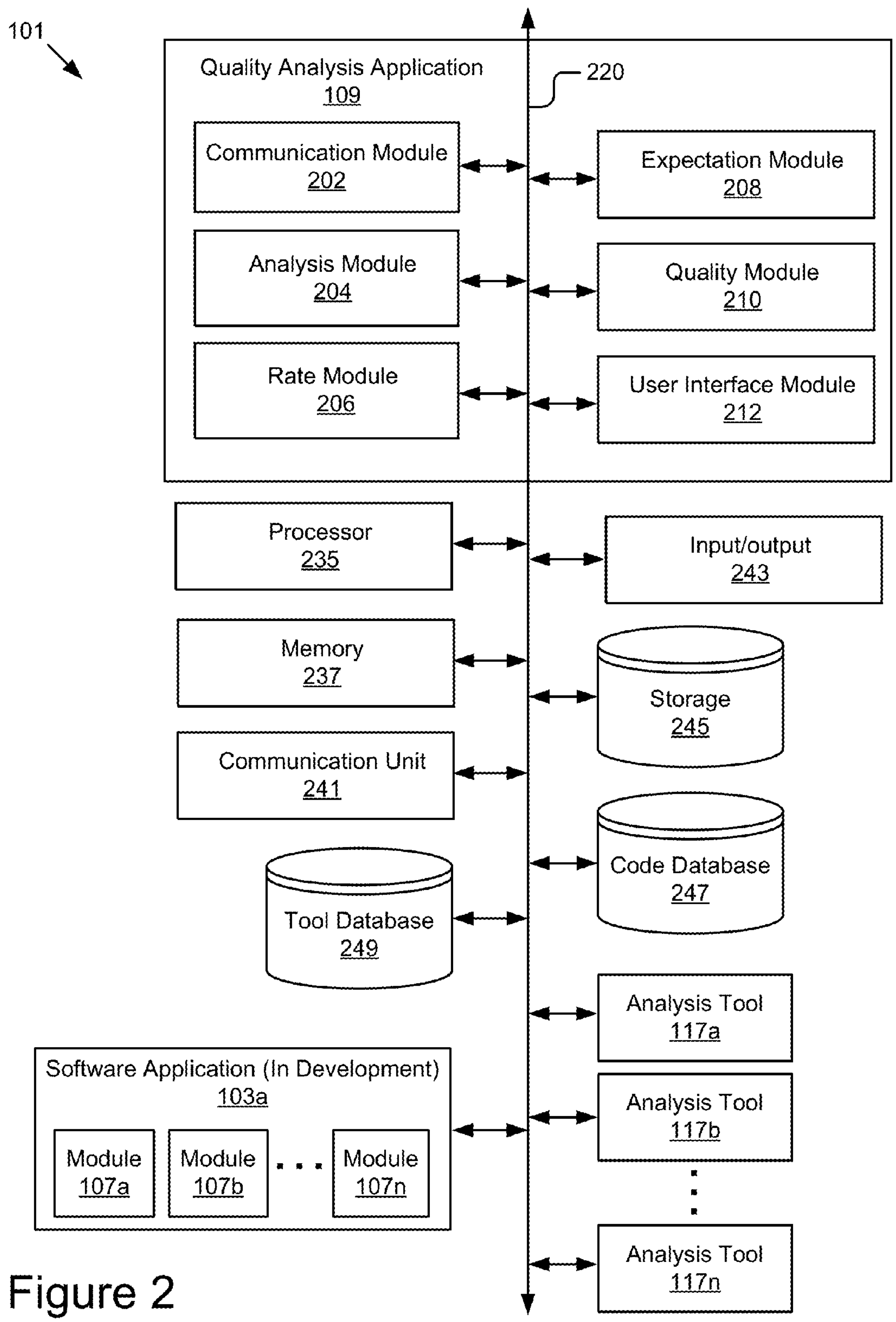
FIG. 2 is a block diagram illustrating an example computing system having an example quality analysis application.

Referring now to FIG. 2, an example computing system 101 having an example quality analysis application 109 is shown in more detail. As shown, the computing system 101 may include a quality analysis application 109, a processor 235, a memory 237, a communication unit 241, an input/output device 243, a storage device 245, a code database 247, a tool database 249, a software application 103*a*, and analysis tools 117*a*, 117*b* . . . 117*n* according to some embodiments. The components of the computing system 101 are communicatively coupled by a bus 220. The bus 220 can include any type of conventional communication bus for transferring data between components of a computing device, or between computing devices.

The processor 235 can include one or more processing units, such as an arithmetic logic unit, a microprocessor, a general purpose controller, a specialized processing unit, or some other processor array to perform computations and provide electronic display signals to a display device. The processor 235 can process data signals and may include various computing architectures including a complex instruction set computer (CISC) architecture, a reduced instruction set computer (RISC) architecture, an architecture implementing a combination of instruction sets, etc. In some embodiments, the processing device 502 may include one or more general processors, special-purpose processing devices such as an application specific integrated circuit (ASIC), a field programmable gate array (FPGA), a digital signal processor (DSP), network processor, or the like. Although FIG. 2 depicts a single processor 235, multiple processors 235 may be included. Other processors, operating systems, sensors, displays and physical configurations are possible.

The memory 237 can include one or more non-transitory computer-readable media for storing instructions and/or data that can be executed by the processor 235. The instructions and/or data may include code for performing the techniques described herein. In some embodiments, the memory 237 can store the quality analysis application 109. The memory 237 may include a dynamic random access memory (DRAM) device, a static random access memory (SRAM) device, embedded memory, flash memory, or some other memory device. In some embodiments, the memory 237 can also include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 can transmit and receive data to and from the embedded system execution platform 115 and/or the client device 135. The communication unit 241 may be coupled (wiredly, wirelessly, etc.) to the network 105 to communicate with other entities forming the network 105. In some embodiments, the communication unit 241 may include one or more ports for direct physical connection to the network 105 or to another communication channel. For example, the communication unit 241 may include a USB, SD, CAT-5 or similar port for wired communication with the embedded system execution platform 115 and/or the client device 135. In some embodiments, the communication unit 241 may include a wireless transceiver for exchanging data with the embedded system execution platform 115 or other communication channels using one or more wireless communication methods, including IEEE 802.11, IEEE 802.16, BLUETOOTH®, dedicated short-range communications (DSRC) or another suitable wireless communication method.

In some embodiments, the communication unit 241 can include a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 can include a wired port and a wireless transceiver. The communication unit 241 can also provide other conventional connections to the network 105 for distribution of files and/or media objects using standard network protocols including TCP/IP, HTTP, HTTPS, and SMTP, etc.

The storage device 245 can include a non-transitory storage medium that can store data for providing the structure, acts, and/or functionality described herein. The storage device 245 may be included in the computing system 101 or may comprise or be included in another computing device and/or storage system distinct from but coupled to or accessible by the computing system 101. The storage device 245 may include hardware and/or software for storing and providing access to the software code. In some embodiments, the storage device 245 may be incorporated with the memory 237 and/or the storage device 245, or may be distinct therefrom. In some embodiments, the storage device 245 may include a database management system (DBMS) for storing and providing access to data. The storage device 245 may include solid state memory (e.g., flash memory, RAM, etc.), a hard drive, tape system, a floppy disk drive, a CD-ROM device, a DVD-ROM device, a DVD-RAM device, a DVD-RW device, or some other mass storage device for storing information.

In some embodiments, the storage device 245 can store one or more of tool-output results generated by analysis tools 117 that describe faults and/or validations identified by the analysis tools 117, analysis results characterizing the faults and/or validations identified by the analysis tools 117, an expectation of a number of faults for software code, quality analysis results for software code, an expectation of a fault density for a code module 107, etc. In some embodiments, the storage device 245 may store other data for providing the structure, acts, and/or functionality described herein.

The code database 247 includes an information source for storing and providing access to software code (e.g., source code, lines of code, code modules 107, compiled objects, etc.). The code database 247 may be included in the computing system 101 or may comprise or be included in another computing device and/or storage system distinct from but coupled to or accessible by the computing system 101. The code database 247 may include hardware and/or software for storing and providing access to the software code. In some embodiments, the code database 247 may be incorporated with the memory 237 and/or the storage device 245, or may be distinct therefrom. In some embodiments, the code database 247 may include a versioning control system (VCS) operable by the computing system 101 for managing changes to the software stored thereby. Examples of VCSs may include CVS, subversion, Git, etc. In some embodiments, the code database 247 may include or be included in a database management system (DBMS) operable by the computing system 101. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations. The code database 247 may include one or more non-transitory computer-readable media, such as solid state memory (e.g., flash memory, RAM, etc.), a hard drive, tape system, a floppy disk drive, a CD-ROM device, a DVD-ROM device, a DVD-RAM device, a DVD-RW device, or some other mass storage device for storing information.

The quality analysis application 109 can analyze quality of the software code stored in and accessible from the code database 247. In some embodiments, the code database 247 can store specialized software code for testing the analysis tools 117. For example, the code database 247 can store test code that can be used to determine a falseness rate and/or a detection rate of an analysis tool 117. In some embodiments, the code database 247 may store other data for providing the structure, acts, and/or functionality described herein.

The tool database 249 can include a non-transitory storage medium that can store data associated with analysis tools 117 for providing the structure, acts and/or functionality described herein. In some embodiments, the tool database 249 may include a database management system (DBMS) for storing and providing access to data. The tool database 249 may include solid state memory (e.g., flash memory, RAM, etc.), a hard drive, tape system, a floppy disk drive, a CD-ROM device, a DVD-ROM device, a DVD-RAM device, a DVD-RW device, or some other mass storage device for storing information.

In some embodiments, the tool database 249 can store one or more of detection rates associated with analysis tools 117, falseness rates associated with analysis tools 117 including a false positive rate and a false negative rate for each analysis tool 117, etc. In some embodiments, the tool database 249 may store other data for providing the structure, acts, and/or functionality described herein. In some embodiments, the tool database 249, the code database 247, and/or the storage 245 may be integrated into a single data storage component or system or may be or included distinct storage components or systems.

As depicted in FIG. 2, the quality analysis application 109 can, in some embodiments, include a communication module 202, an analysis module 204, a rate module 206, an expectation module 208, a quality module 210, and a user interface module 212. These components of the quality analysis application 109 are communicatively coupled via the bus 220.

The communication module 202 can include software and/or logic for handling communications between components of the quality analysis application 109 and other components of the computing system 101. In some embodiments, the communication module 202 can be a set of instructions executable by the processor 235 to provide the structure, acts, and/or functionality described herein for handling communications between components of the quality analysis application 109 and other components of the computing system 101. In some embodiments, the communication module 202 can be stored in the memory 237 of the computing system 101 and can be accessible and executable by the processor 235. The communication module 202 may be adapted for cooperation and communication with the processor 235 and other components of the computing system 101.

The communication module 202 can send and receive data, via the communication unit 241, to and from the client device 135 and/or the embedded system execution system 115. For example, the communication module 202 can receive graphical data for providing a user interface to a user from the user interface module 212 and send the graphical data to the client device 135, causing the client device 135 to present the user interface to the user.

In some embodiments, the communication module 202 can receive data from other components of the quality analysis application 109 and store the data in the storage device 245, the code database 247 and/or the tool database 249. For example, the communication module 202 can receive data describing a falseness rate of an analysis tool 117 from the rate module 206 and store the data in the storage device 245, the code database 247 and/or the tool database 249. In some embodiments, the communication module 202 can retrieve data from the storage device 245, the code database 247, and/or the tool database 249, and send the retrieved data to other components of the quality analysis application 109. For example, the communication module 202 can retrieve software code from the code database 247 and send the software code to the analysis module 204.

The analysis module 204 can be software and/or logic for analyzing software code to generate analysis results. For example, the analysis module 204 can analyze software code (e.g., lines of code, code modules 107, etc.) using a plurality of analysis tools 117 and generate analysis results for the software code. In some embodiments, the analysis module 204 can be a set of instructions executable by the processor 235 to provide the structure, acts, and/or functionality described herein for analyzing software code to generate analysis results. In some embodiments, the analysis module 204 can be stored in the memory 237 of the computing system 101 and can be accessible and executable by the processor 235. The analysis module 204 may be adapted for cooperation and communication with the processor 235 and other components of the computing system 101.

One or more analysis tools 117 can be applied to analyze software code. Each analysis tool 117 can generate a tool-output result describing faults and/or validations identified by that tool. The analysis module 204 can receive a set of tool-output results associated with the software code from a set of analysis tools 117, and generate an analysis result for the software code from the set of tool-output results as described herein. For example, the analysis module 204 can aggregate the faults and/or validations identified in the set of tool-output results to generate the analysis result.

In some embodiments, the software code can include one or more lines of code. For each line of code, the analysis module 204 can receive a tool-output result from each analysis tool 117 and/or an information source (e.g., the storage 245, the tool database 249, etc.), and generate an analysis result for that line of code based on all the tool-output results from all the analysis tools 117. The analysis module 204 can aggregate the faults and/or validations identified in the tool-output results and/or compute one or more analysis metrics when generating the analysis result. For example, the analysis module 204 can generate an analysis result for a given line of code l by performing at least one or more of the following operations: (1) receiving tool-output results for a line of code from a plurality of analysis tools 117; (2) identifying, based on the tool-output results, a first set of tools $G_R^l$ that identified one or more faults in the line of code l; (2) identifying, based on the tool-output results, a second set of tools $G_G^l$ that validated the line of code l as being fault-free; (3) determining, based on the tool-output results, the number of faults identified by a given tool in the line of code l, as represented by $f_R^l$ (i), where (i) indicates the tool; (4) determining the number of tools $n_R^l$ included in the first set of tools $G_R^l$; and (5) determining a number of tools $n_G^l$ included in the second set of tools $G_G^l$.

In some embodiments, the analysis result can aggregate faults and/or validations related to a line of code with each fault and/or validation identified by at least one of the analysis tools 117. For example, an analysis result for a line of code can include at least one or more of: (1) the line number, represented by the symbol l, identifying the line of code; (2) a set of analysis tools 117, represented by a set $G_R^l$, that identify the line of code as a faulty line, such as a red line (e.g., from among Tools 1-5, the set includes Tool 1, Tool 3 and Tool 5 that identify the line of code as a red line); (3) a set of analysis tools 117, represented by a set $G_G^l$, that identify the line of code as a fault-free line, such as a green line (e.g., from among Tools 1-5, the set includes Tool 2 and Tool 4 that identify the line of code as a green line); (4) the number of faults included in the line of code (e.g., shown in red), represented by the symbol $f_R^l$ (i); (5) the number of analysis tools 117, represented by the symbol $n_R^l$, identifying the line of code as faulty (e.g., red) (e.g., the number of tools included in the set $G_R^l$); and (6) the number of analysis tools 117, represented by the symbol $n_G^l$, identifying the line of code as fault-free (e.g., green) (e.g., the number of tools included in the set $G_G^l$). It should be understood that the above analysis data is provided by way of example, and the analysis result for a line of code can include other types of analysis data.

In some embodiments, the software code can include one or more code modules 107. The analysis module 204 can receive tool-output results for each code module 107 from a plurality of analysis tools 117 and/or an information source (e.g., the storage 245, the tool database 249, etc.), and generate an analysis result for each code module 107 based on the tool-output results. In some embodiments, the analysis result can characterize faults and/or validations related to that code module 107 identified by the set of analysis tools 117. The analysis module 204 can aggregate the faults and/or validations identified in the tool-output results and/or compute one or more analysis metrics when generating the analysis result for a given code module 107. For example, the analysis module 204 can generate an analysis result for a code module 107 by performing at least one or more of the following operations: (1) receiving tool-output results from a plurality of analysis tools 117; (2) determining a number of lines included in the code module 107, represented by $l^m$; (3) determining, based on the tool-output results, a number of faults in the code module 107 with each fault identified by at least one analysis tool 117, represented by $f_R^m$; (4) determining, based on the tool-output results, a first set of analysis tools 117, with each tool identifying that the code module 107 may have at least one potentially faulty line such as a red line, represented by a set $G_R^m$; (4) determining, based on the tool-output results, a second set of analysis tools 117 that each can validate the code module 107 as potentially fault-free code such as green lines, represented by a set $G_G^m$; (5) identifying, based on the tool-output results, a number of analysis tools 117 that can identify at least one of the faults, represented by $n_R^m$; and (6) identifying, based on the tool-output results, a number of analysis tools 117 that can validate the code module 107 to be fault-free, represented by $n_G^m$.

In some embodiments, an analysis result for a code module 107 (which can be represented by a symbol m) can include at least one or more of: (1) the number of lines of code in the code module 107, represented by a symbol $l^m$; (2) the number of faults (e.g., shown in red), represented by a symbol $f_R^m$, as determined by the one or more analysis tools 117; (3) a set of analysis tools 117, represented by a set $G_R^m$, that identify the code module 107 as having at least one faulty line, such as a red line (e.g., a set including Tool 1, Tool 3 and Tool 5 that each can identify the code module 107 having red lines); (4) a set of analysis tools 117, represented by a set $G_G^m$, that each can identify the code module 107 as being fault-free code, such as showing the code module 107 in green (e.g., a set including Tool 2 and Tool 4 that each can identify the code module 107 as fault-free); (5) the number of analysis tools, represented by a symbol $n_{Rn}^m$, that identify that the code module 107 as having at least one red line (e.g., the number of tools in the set $G_R^m$); and (6) the number of analysis tools 117, represented by a symbol $n_G^m$, that identify the code module 107 as being fault free (e.g., the number of tools in the set $G_G^m$). It should be understood that an analysis result for a code module 107 can include other analysis data.

In some embodiments, the analysis module 204 can send an analysis result for each line of code and/or each code module 107 to the expectation module 208, the quality module 210 and/or the user interface module 212. In some embodiments, the analysis module 204 can store the analysis result for each line of code and/or each code module 107 in the storage 245.

The rate module 206 can be software and/or logic for determining a falseness rate and/or a detection rate for each analysis tool 117 and/or across analysis tools 117. In some embodiments, the rate module 206 can be a set of instructions executable by the processor 235 to provide the structure, acts, and/or functionality described herein for determining a falseness rate and/or a detection rate for an analysis tool 117. In some embodiments, the rate module 206 can be stored in the memory 237 of the computing system 101 and can be accessible and executable by the processor 235. The rate module 206 may be adapted for cooperation and communication with the processor 235 and other components of the computing system 101.

The rate module 206 can evaluate the effectiveness of one or more analysis tools 117 including, for example, how proficiently each of the analysis tools 117 can correctly identify faults and/or validations. In some embodiments, the rate module 206 can determine a falseness rate and/or detection rate associated with each analysis tool 117 as described herein.

A falseness rate associated with an analysis tool 117 can include a false positive rate and/or a false negative rate. A false positive rate can describe a rate at which an analysis tool 117 may produce a positive result when no fault exists. A false positive result can also be referred to as a false alarm. For example, a false positive rate of 5% can indicate that 5% of the faults detected by an analysis tool 117 are false alarms (not actually faults). A false negative rate can describe a rate at which an analysis tool 117 may produce a negative result when at least one fault exists. For example, a false negative rate of 3% can indicate that 3% of the lines of code or the code modules 107 determined by a given analysis tool 117 to be fault-free actually contain faults.

A detection rate for an analysis tool 117 can describe a rate at which the analysis tool 117 is capable of detecting faults. The detection rate may indicate how proficient a given analysis tool 117 is at detecting faults. For example, a detection rate of 80% can indicate that an analysis tool 117 is capable of detecting 80% of the faults in the software code.

In some embodiments, the rate module 206 can store one or more clean (bug-free) collections source code in the code database 247. Using the clean collection(s) of source code, the rate module 206 can generate one or more dirty collections of source code that may include intentionally implemented bugs. For example, the rate module 206 can generate a dirty collection of faulty source code by intentionally inserting different types of bugs and/or different variations of bugs into the corresponding clean collection of source code. In another example, a user can manually insert different types of bugs or different variations of bugs into the clean collection of source code. The rate module 206 can store the dirty collection(s) of faulty source code in the code database 247. The clean collection(s) of source code can be the same or substantially similar to the dirty collection(s) of source code except that the dirty collection(s) of source code may include the intentionally implemented bugs.

The clean and dirty collection(s) of source code can serve as test cases for evaluating the analysis tools 117. The rate module 206 can generate verified data reflecting whether each line of code or each code module 107 in the test cases may include one or more faults or may be fault-free. For example, the rate module 206 can generate verified data reflecting that (1) lines of code in the clean collection(s) of source code can be fault-free and (2) some particular lines of code in the dirty collection(s) of source code may have intentionally implemented faults. The verified data can be true data already verified by a user such as a programmer.

Each analysis tool 117 can analyze one or more clean collections of source code and one or more corresponding dirty collections of source code for faults and generate tool-output results describing the faults. The rate module 206 can compare the tool-output results with the verified data to generate an evaluation result for each analysis tool 117. For example, an analysis tool 117 may produce a result that falsely identifies a clean set of code as including one or more faults and a dirty set of code as not having one or more faults, and the rate module 206 can compare that result to corresponding verified data to determine statistics for that analysis tool 117 including the rates at which the tool falsely identifies code to have or not have faults. Example statistics can include, but are not limited to, a false positive rate, a false negative rate and a detection rate for the analysis tool 117, etc. In some embodiments, some analysis tools 117 may provide a management function to identify true bugs by using user inputs such as inputs from programmers, so that the evaluation of the false positive rate, false negative rate, and detection rate for the analysis tools 117 can be improved. Various additional examples and non-limiting embodiments related to the performance, productivity, confidence, and efficiency of the analysis tools 117, as determined by the rate module 206, are discussed in further detail below with reference to at least FIGS. 8A-14.

A given evaluation result may include one or more statistics that characterize the performance of an analysis tool 117, as described above. The evaluation results for the analysis tools 117 may be stored in association with the tools 117 in a table (e.g., see FIG. 7B) included in a data store, such as the tool database 249, for later access and/or retrieval, or may be generated at runtime and provided by the rate module 206 to the component requesting it. For example, in some embodiments, the rate module 206 can send data describing the falseness rate (e.g., the false positive rate, the false negative rate, etc.) and/or the detection rate for each analysis tool 117 to the expectation module 208 and/or the quality module 210.

The expectation module 208 can be software and/or logic for determining a fault expectation. A fault expectation can include an expectation of the number of faults for a given line of code and/or an expectation of a fault density for a given code module 107. In some embodiments, the expectation module 208 can be a set of instructions executable by the processor 235 to provide the structure, acts, and/or functionality described herein for determining a fault expectation. In some embodiments, the expectation module 208 can be stored in the memory 237 of the computing system 101 and can be accessible and executable by the processor 235. The expectation module 208 may be adapted for cooperation and communication with the processor 235 and other components of the computing system 101.

The expectation module 208 can receive data describing a falseness rate (such as a false positive rate and/or a false negative rate) and/or a detection rate for each analysis tool 117 from another component of the system 100, such as the rate module 206 and/or the tool database 249. The expectation module 208 can receive an analysis result for each line of code or each code module 107 from another component of the system 100, such as the analysis module 204 and/or the storage 245.

For each line of code, the expectation module 208 can determine an expectation of a number of faults that can be detected by a set of analysis tools 117 based at least in part on (1) the analysis results associated with the line of code aggregated and/or computed from faults and/or validations identified by the set of analysis tools 117 and (2) falseness rates associated with the set of analysis tools 117. In some cases, the set of analysis tools 117 may include a single analysis tool 117. However, in some cases several (e.g., 2, 3, 4, 5+, 10+, 20+, etc.) tools may be included in the set to increase the precision, accuracy, etc., of the expectation determination of the expectation module 208. Given that some or all of the analysis tools 117 may, at certain points, may include an error bias error by falsely detecting faults, either positively, negatively, or both, using multiple tools is an effective heuristic because it can largely reduce, or in some cases eliminate, the error bias. Faults that can be detected by the set of analysis tools 117 may be referred to as tool-detected faults. Potentially, in some cases there can be some faults in the software code that the analysis tools 117 cannot detect, and detection rates of the analysis tools 117 may be no greater than 1 (e.g., less than or equal to 1).

Using the analysis results generated by the analysis module 204, the expectation module 208 can generate the expectation of the number of actual faults by: (1) determining a fault average term; (2) determining a validation average term; and (3) combining the fault average term and the validation average term together or selecting one of the average terms, etc. In some examples, the expectation module 208 can calculate a fault average term related to detected faults as, for example:

$$\text{fault average term} = \frac{\sum_{i \in G_R^l} f_R^l(i) \cdot C_R(i)}{n_R^l},$$

where $C_R(i)$ can represent a true likelihood of red lines detected by Tool i (e.g., $C_R(i)=1-$a false positive rate of Tool i), and i=1, 2, . . . N. The expectation module 208 can calculate a validation average term related to validations as, for example:

$$\text{validation average term} = \frac{\sum_{i \in G_G^l} (1 - C_G(i))}{n_G^l},$$

where $C_G(i)$ can represent a true likelihood of green lines detected by Tool i (e.g., $C_G(i)=1-$a false negative rate of Tool i).

If both the number of analysis tools 117 that can identify the line of code as a red line and the number of analysis tools 117 that can identify the line of code as a green line can have non-zero values (e.g., $n_R^l \neq 0$, $n_G^l \neq 0$), the expectation module 208 can determine the expectation of the number of the faults (represented as $E_l$) as a multiplication of the fault average term and the validation average term (e.g., $E_l$=the fault average term×the validation average term).

If the number of analysis tools 117 that can identify the line of code as a red line has a zero value (e.g., $n_R^l=0$) and the number of analysis tools 117 that can identify the line of code as a green line has a non-zero value (e.g., $n_G^l \neq 0$), the expectation module 208 may determine the expectation of the number of faults as the validation average term (e.g., $E_l$=the validation average term).

If the number of analysis tools 117 that can identify the line of code as a red line has a non-zero value (e.g., $n_R^l=0$) and the number of analysis tools 117 that can identify the line of code as a green line has a zero value (e.g., $n_G^l=0$), the expectation module 208 may determine the expectation of the number of the faults as the fault average term (e.g., $E_l$=the fault average term).

If both the number of analysis tools 117 that can identify the line of code as a red line and the number of analysis tools 117 that can identify the line of code as a green line have a zero value (e.g., $n_R^l=0$, $n_G^l=0$), the expectation module 208 may determine the expectation of the number of faults by averaging the number of faults found in the other lines of code included in the source code under analysis For each code module 107, the expectation module 208 can determine an expectation of a fault density that can be detected by analysis tools 117 based at least in part on (1) an analysis result associated with the code module 107 and (2) falseness rates associated with the analysis tools 117. The fault density detected by analysis tools 117 can be referred to as a tool-detected fault density.

The expectation module 208 can generate an expectation of the fault density by: (1) determining a fault average term for the code module 107; (2) determining a validation average term for the code module 107; and (3) combining the fault average term and the validation average term together or selecting one of the average terms, etc. In some examples, the expectation module 208 can calculate a fault average term related to detected faults for the code module 107 as, for example:

$$\text{fault average term} = \frac{\sum_{i \in G_R^m} f_R^m \cdot C_R(i)}{n_R^m \cdot l^m},$$

where $C_R(i)$ can represent a true likelihood of red lines detected by Tool i (e.g., $C_R(i)=1-$a false positive rate of Tool i), i=1, 2, . . . N. The expectation module 208 can calculate a validation average term related to validations for the code module 107 as, for example:

$$\text{validation average term} = \frac{\sum_{i \in G_G^m} (1 - C_G(i))}{n_G^m},$$

where $C_G(i)$ can represent a true likelihood of green lines detected by Tool i (e.g., $C_G(i)=1-$a false negative rate of Tool i).

If both the number of analysis tools 117 that can identify faults such as red lines in the code module 107 and (2) the number of analysis tools 117 that can identify the code module 107 as fault free such as green lines have non-zero values (e.g., $n_R^m=0$, $n_G^m=0$), the expectation module 208 may determine the expectation of the fault density (represented as $E_m$) as a multiplication of the fault average term and the validation average term (e.g., $E_m$=the fault average term×the validation average term).

If the number of analysis tools 117 that can identify faults such as red lines in the code module 107 has a zero value (e.g., $n_R^m=0$) and the number of analysis tools 117 that can identify the code module 107 as fault free such as green lines has a non-zero value (e.g., $n_G^m=0$), the expectation module 208 may determine the expectation of the fault density as the validation average term (e.g., $E_m$=the validation average term).

If the number of analysis tools 117 that can identify faults such as red lines in the code module 107 has a non-zero value (e.g., $n_R^m=0$) and the number of analysis tools 117 that can identify the code module 107 as fault free such as green lines has a zero value (e.g., $n_G^m=0$), the expectation module 208 may determine the expectation of the fault density as the fault average term (e.g., $E_m$=the fault average term).

If both the number of analysis tools 117 that can identify faults such as red lines in the code module 107 and the number of analysis tools 117 that can identify the code module 107 as fault free such as green lines have a zero value (e.g., $n_R^m=0$, $n_G^m=0$), the expectation module 208 may determine the expectation of the fault density by averaging the number of faults found in the other code modules included in the source code under analysis.

In some embodiments, the expectation module 208 can send expectation data describing fault expectations that can include the expectation of the number of faults and/or the expectation of the fault density, etc., to the quality module 210 and/or the user interface module 212. In some embodiments, the expectation module 208 can store the expectation data in the storage 245 for access and/or retrieval by these components.

The quality module 210 can be software and/or logic for performing quality analysis of software code. In some embodiments, the quality module 210 can be a set of instructions executable by the processor 235 to provide the structure, acts, and/or functionality described herein for performing quality analysis of software code. In some embodiments, the quality module 210 can be stored in the memory 237 of the computing system 101 and can be accessible and executable by the processor 235. The quality module 210 may be adapted for cooperation and communication with the processor 235 and other components of the computing system 101.

The quality module 210 can receive expectation data from the expectation module 208 and/or the storage 245, and may use it along with other data, such as the tool-related and code-related data described herein, to perform quality assurance (QA) analysis on software. As noted elsewhere herein, in some cases the expectation data may include fault expectations and fault densities for one or more lines of codes and/or code modules 107, such as an expectation of a number of faults for each line of code and/or the fault density for one or more code modules 107 included in the software. The quality module 210 may use this data to reliably monitor the software quality while the software is being developed (in the implementation phase) by eliminating the false negatives and/or positives surfaced by the analysis tools 117 and indicating whether and/or where actual faults still exist.

In some embodiments, the quality module 210 can determine software reliability growth for software code based on the estimated number of faults. The software reliability growth can describe a cumulated number of faults detected in the software code as a function of time. For example, as the time passes, more and more faults can be detected in the software code. However, the total number of faults can asymptotically approach a finite value. The quality module 210 can send data describing the curve that depicts the software reliability growth to the user interface module 212. In some embodiments, the quality module 210 can store data describing the curve in the storage 245.

The user interface module 212 can be software and/or logic for generating graphical data for providing user interfaces to users. In some embodiments, the user interface module 212 can be a set of instructions executable by the processor 235 to provide the structure, acts, and/or functionality described herein for generating graphical data for providing user interfaces to users. In some embodiments, the user interface module 212 can be stored in the memory 237 of the computing system 101 and can be accessible and executable by the processor 235. The user interface module 212 may be adapted for cooperation and communication with the processor 235 and other components of the computing system 101.

The user interface module 212 can generate graphical data for providing a user interface to a user. In some embodiments, the user interface module 212 can be stored in the computing system 101 to generate graphical data for providing a user interface to a user. The user interface module 212 can send the graphical data to a display device coupled to the computing system 101, causing the display device to present the user interface to the user. In some embodiments, the user can access the computing system 101 remotely. The user interface module 212 can send the graphical data to the client device 135 via the network 105, causing the client device 135 to present the user interface to the user on a display device coupled to the client device 135 (e.g., via a native application and/or a web browser). For example, the user interface can, for a given software, present the quality analysis summary of the software produced by the quality module 210 including graphs, tables, data, descriptions, etc., that include the associated fault expectation and/or fault densities associated with various lines and/or modules comprising the software, as determined by the expectation module 208; incorporate the associated analysis result(s) produced by the analysis module 204 and the corresponding tool-output results produced by the analysis tools 117; etc. It should be understood that the user interface module 212 may generate graphical data for providing other user interfaces to users.

Methods

Figure 3:
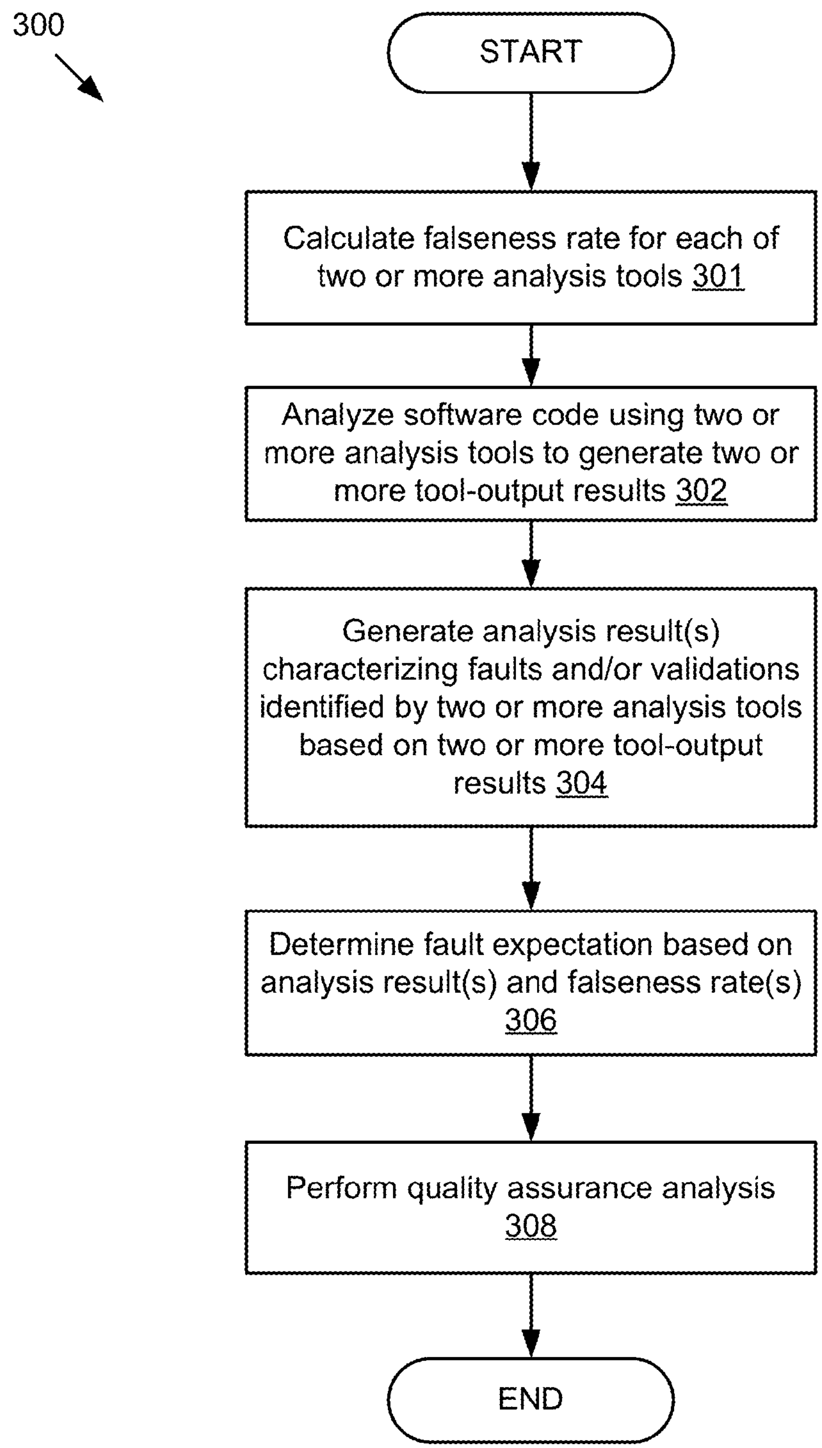
FIG. 3 is a flowchart of an example method for analyzing software code for embedded systems using a plurality of analysis tools.

FIG. 3 is a flowchart of an example method 300 for analyzing software code for embedded systems using a plurality of analysis tools 117. The rate module 206 can calculate 301 a falseness rate for each of two or more analysis tools 117. The falseness rate can include a false positive rate and/or a false negative rate. An example method 301 for determining a false rate is illustrated with reference to at least FIG. 6. The analysis module 204 can analyze 302 software code using the two or more analysis tools 117 to generate two or more tool-output results. In some embodiments, the software code can include lines of code and/or code modules 107.

The analysis module 204 can generate 304 an analysis result characterizing faults and/or validations identified by the two or more analysis tools 117 for the software code based on the two or more tool-output results. For example, the analysis module 204 can aggregate and process all of the faults and validations identified by the analysis tools 117 in the tool-output results to generate an analysis result for each line of code and/or code module included in the software code. The expectation module 208 can determine 306 a fault expectation based at least in part on the analysis result(s) and/or the falseness rate, where the fault expectation can include an expectation of a number of actual faults and/or an expectation of an actual fault density, as discussed elsewhere herein. The quality module 210 can perform 308 quality assurance analysis for the software code based on the fault expectation.

Figure 4A:
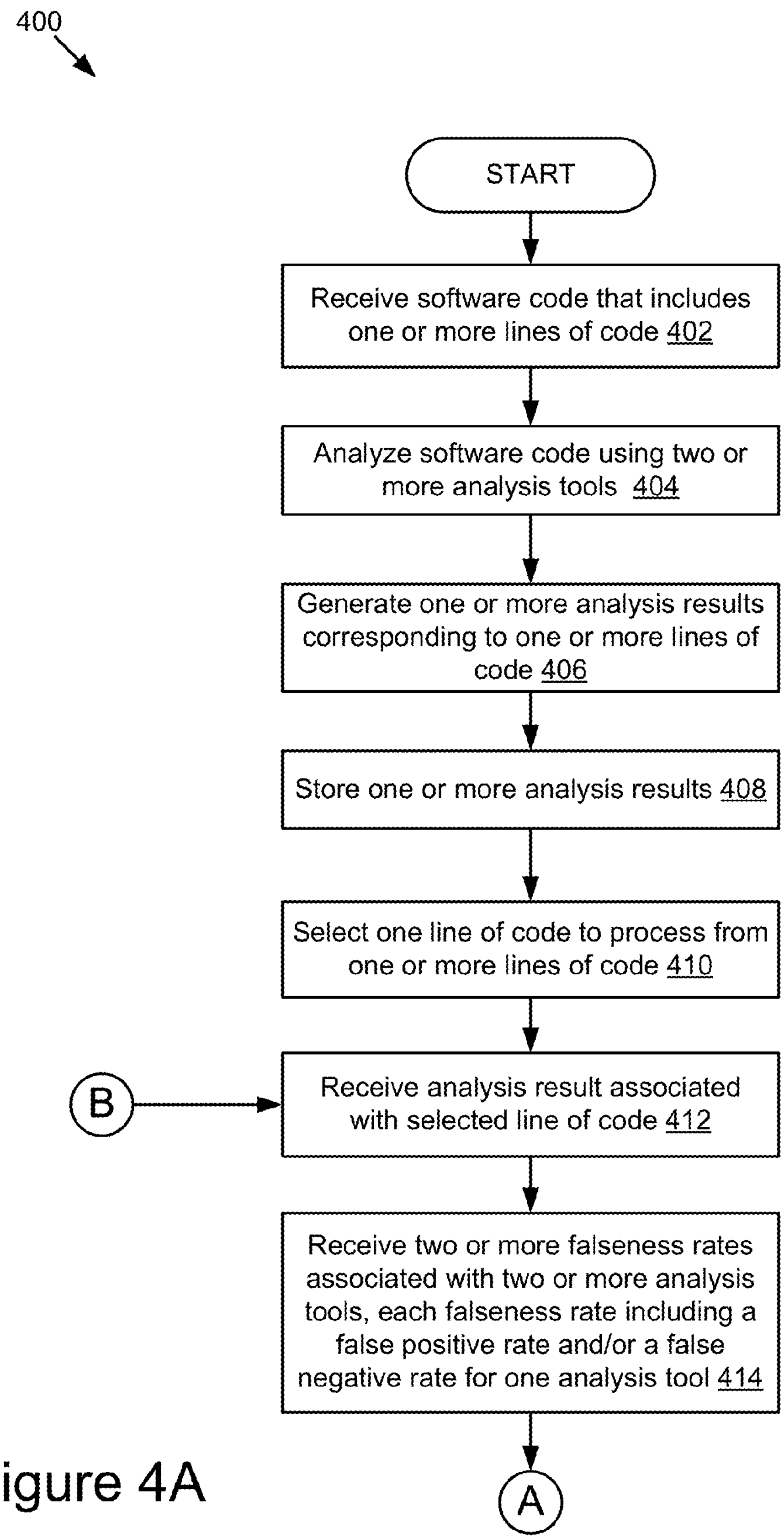
FIGS. 4A and 4B are flowcharts of an example method for analyzing software code for embedded systems using a plurality of analysis tools.
Figure 4B:
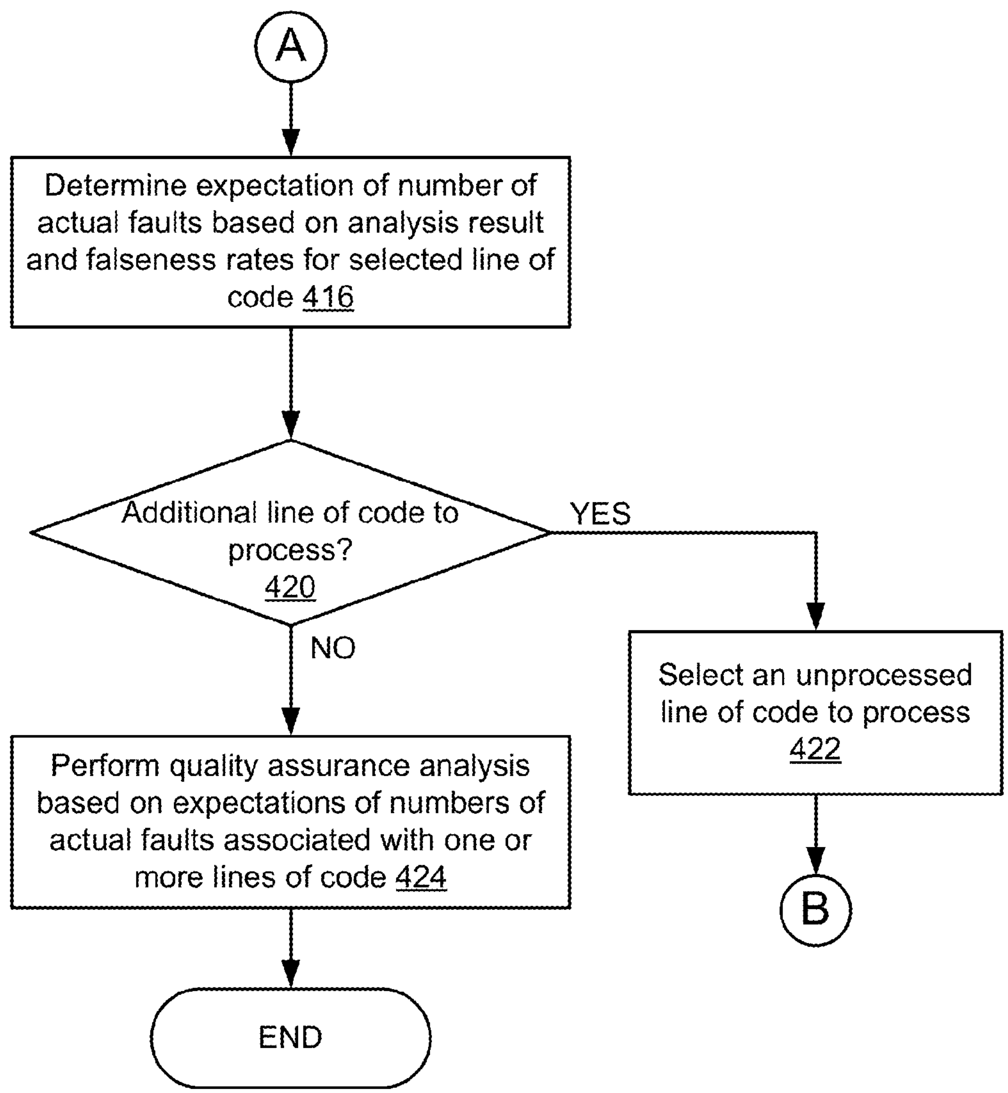

FIGS. 4A and 4B are flowcharts of an example method 400 for analyzing software code for embedded systems using a plurality of analysis tools 117. Referring to FIG. 4A, the communication module 202 can receive 402 software code that may include one or more lines of code from the code database 247. The analysis tools 117 can analyze 404 the software code to generate tool-output results. The analysis module 204 can generate 406 one or more analysis results corresponding to the one or more lines of code based on the tool-output results. The analysis module 204 can store 408 the one or more analysis results in a data store, such as the storage 245.

The expectation module 208 can select 410 a line of code to process from the one or more lines of code. The expectation module 208 can receive 412 an analysis result associated with the selected line of code from the analysis module 204 and/or a data store such as the storage 245. The expectation module 208 can receive 414 two or more falseness rates associated with the two or more analysis tools 117 from the rate module 206 and/or a data store such as the storage 245. Each falseness rate can include a false positive rate and/or a false negative rate for a corresponding analysis tool 117.

Referring to FIG. 4B, the expectation module 208 can determine 416 an expectation of a number of actual faults for the selected code of line based on the analysis result and the falseness rates of the two or more analysis tools 117. The analysis module 204 can determine 420 whether there is at least an additional line of code to process. If there is at least an additional line of code to process, the method 400 can move to block 422. Otherwise, the method 400 can move to block 424. At block 422, the analysis module 204 can select an unprocessed line of code to process and the method 400 can move to block 412. At block 424, the quality module 210 can perform quality assurance analysis based on expectations of the numbers of actual faults associated with the one or more lines of code. In some cases, each line of code may be associated with an expectation determination.

Figure 5A:
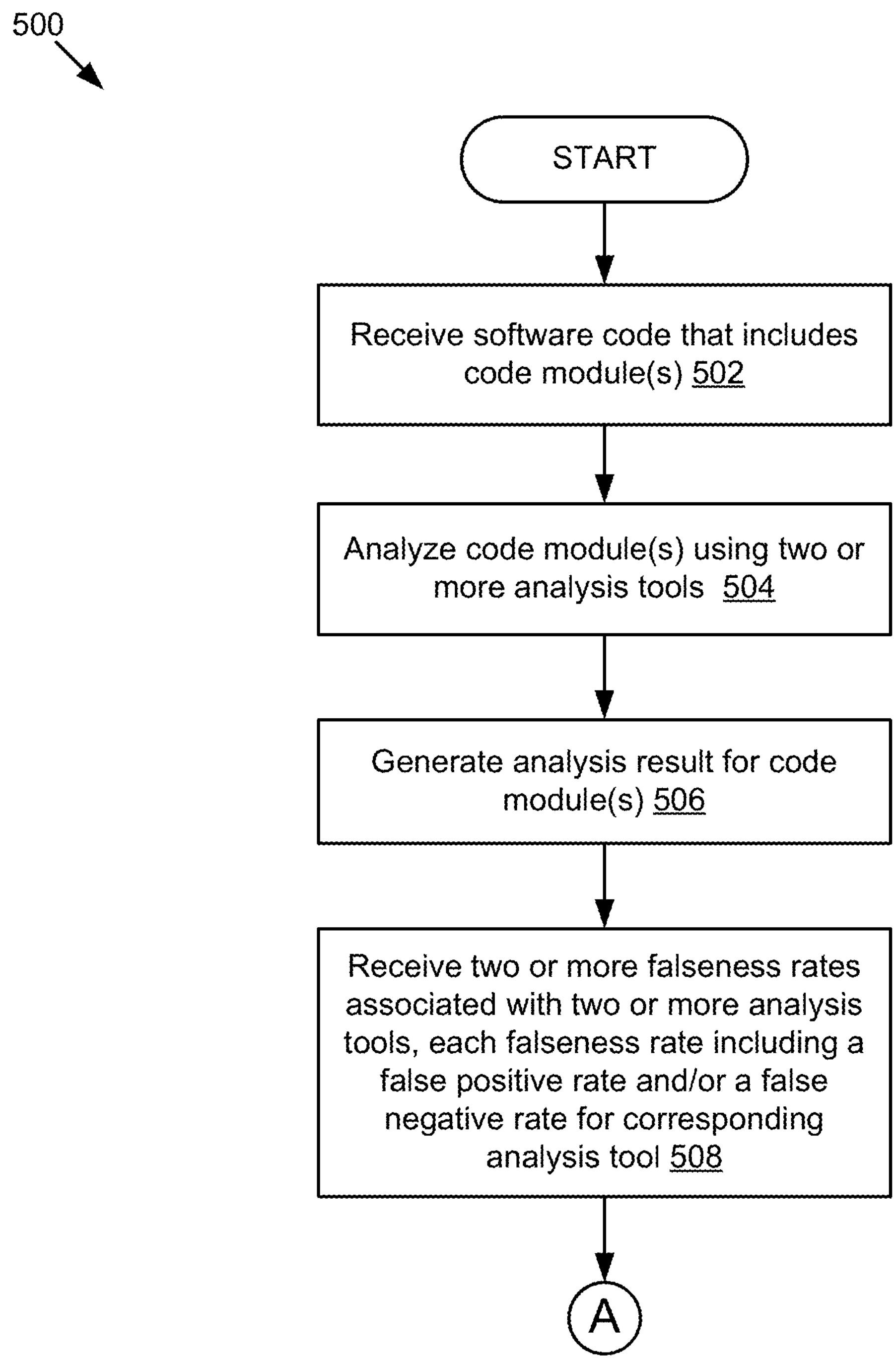
FIGS. 5A and 5B are flowcharts of an example method for analyzing software code for embedded systems using a plurality of analysis tools.
Figure 5B:
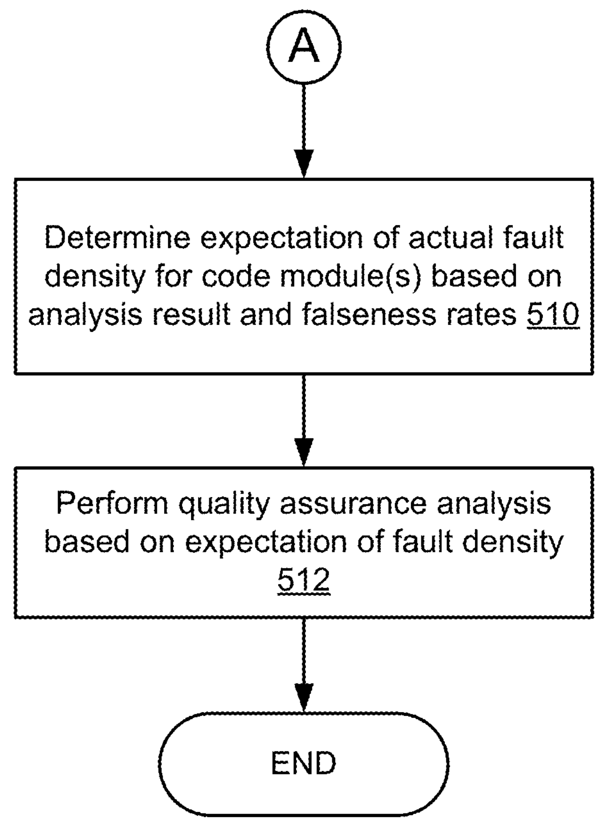

FIGS. 5A and 5B are flowcharts of an example method 500 for analyzing software code for embedded systems using a plurality of analysis tools 117. Referring to FIG. 5A, the communication module 202 can receive 502 software code that may include one or more code modules 107. The analysis tools 117 can analyze 504 each code module 107 to generate tool-output results for that code module 107. The analysis module 204 can generate 506 an analysis result for a code module 107 based on the tool-output results. The expectation module 208 can receive 508 two or more falseness rates associated with the two or more analysis tools 117 from the rate module 206 and/or the storage 245. Each falseness rate can include a false positive rate and/or a false negative rate for the corresponding analysis tool 117.

Referring to FIG. 5B, the expectation module 208 can determine 510 an expectation of an actual fault density for the code module(s) 107 based on the analysis result and the falseness rates of the two or more analysis tools 117. The quality module 210 can perform 512 quality assurance analysis based on the expectation of the fault density. It should be understood that the methods 400 and 500 may, in various cases, be performed in association with one another as part of an overall process that analyzes the lines of code and code modules comprising a collection of software code. For example, various operations of each method 400 and 500 may be combined into further methods to provide various results, such as a comprehensive analysis of a given body of software.

Figure 6:
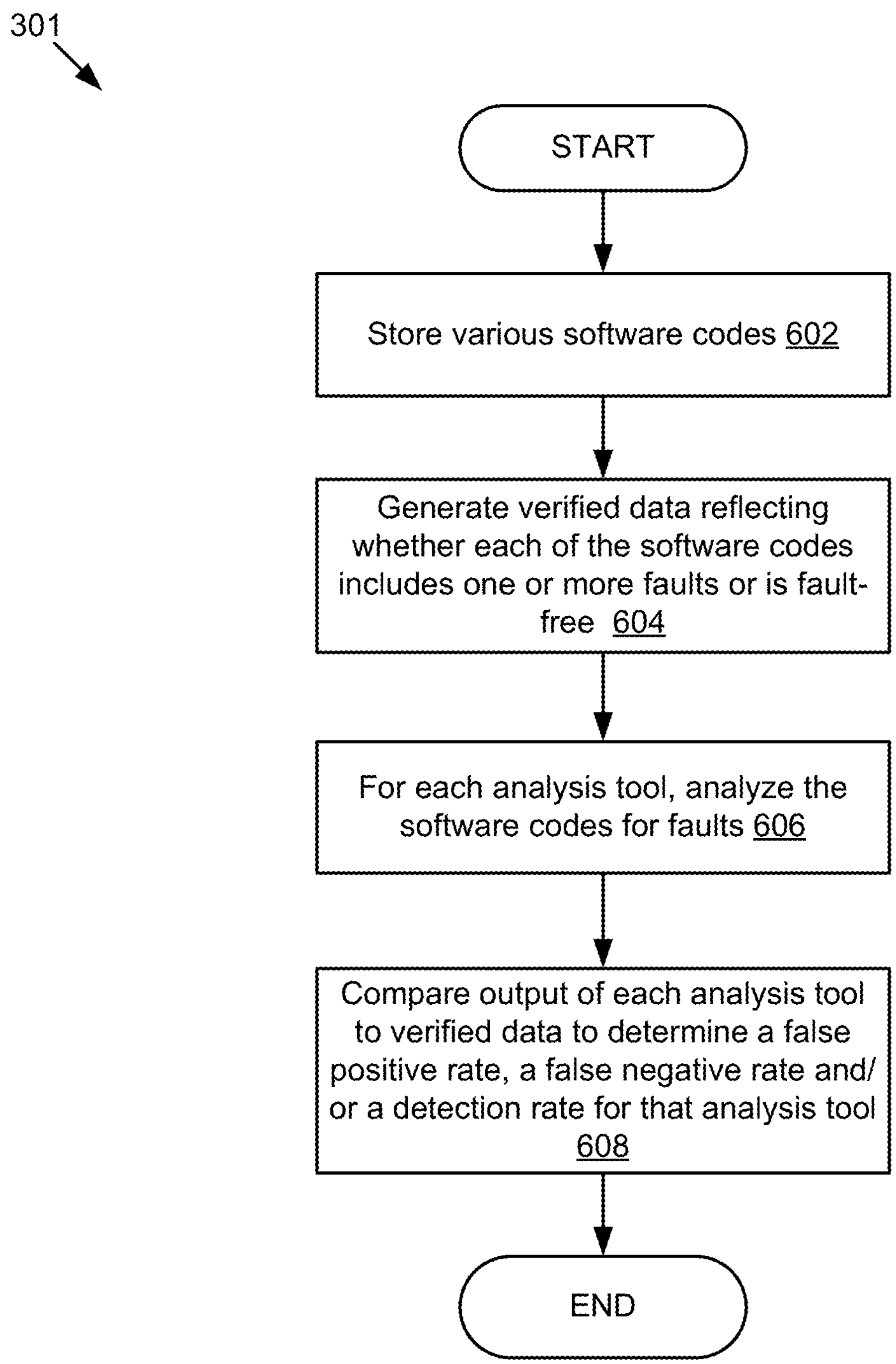
FIG. 6 is a flowchart of an example method for determining falseness rates and/or detection rates for analysis tools.

FIG. 6 is a flowchart of an example method 301 for determining falseness rates and/or detection rates for analysis tools 117. Various software codes may be stored 602 in the code database 247 (e.g., by a developer using a versioning system, by the system 100 (e.g., the rate module 206), etc.). The rate module 206 can generate 604 verified data reflecting whether each of the software codes actually includes one or more faults or is fault-free. One or more analysis tools 117 can analyze 606 each of the software codes and produce one or more tool-output results correspondingly. Each tool-output result can describe faults and/or validations identified by a corresponding analysis tool 117. The rate module 206 can compare 608 the tool-output result of each analysis tool 117 to the verified data to determine a false positive rate, a false negative rate, and/or a detection rate for that analysis tool 117.

Graphic Representations

FIG. 7A is a graphic representation 700 illustrating example software code. The example software code can include a line of code 702 with a fault, which can be underlined using a solid line. In some examples, the line of code 702 can be highlighted in red color to indicate that it includes a fault. The example software code can also include a line of code 704 that may include a function. The line of code 704 can be identified by the analysis tool 117 as fault free, by underlining it using a dashed line. Additionally or alternatively, the line of code 704 can be highlighted in green color. The function included in line 704 may point to a body of code that forms the function. An indication that the function is fault-free may indicate that the body of code that forms the function is fault-free as well.

FIG. 7B is a graphic representation 720 illustrating example likelihoods related to falseness rates for a plurality of analysis tools 117. Column 722 can illustrate a likelihood of faulty lines such as red lines for each analysis tool 117. A likelihood of faulty lines for an analysis tool 117 can be equal to 1 minus a false positive rate of the analysis tool 117. For example, a likelihood of faulty lines for Tool 1 can be expressed as $C_R(1)$=(1−a false positive rate of Tool 1). Column 724 can illustrate a likelihood of fault-free lines such as green lines for each analysis tool 117. A likelihood of fault-free lines for an analysis tool 117 can be equal to 1 minus a false negative rate of the analysis tool 117. For example, a likelihood of fault-free lines for Tool 1 can be expressed as $C_G(1)$=(1−a false negative rate of Tool 1).

Figure 7C:
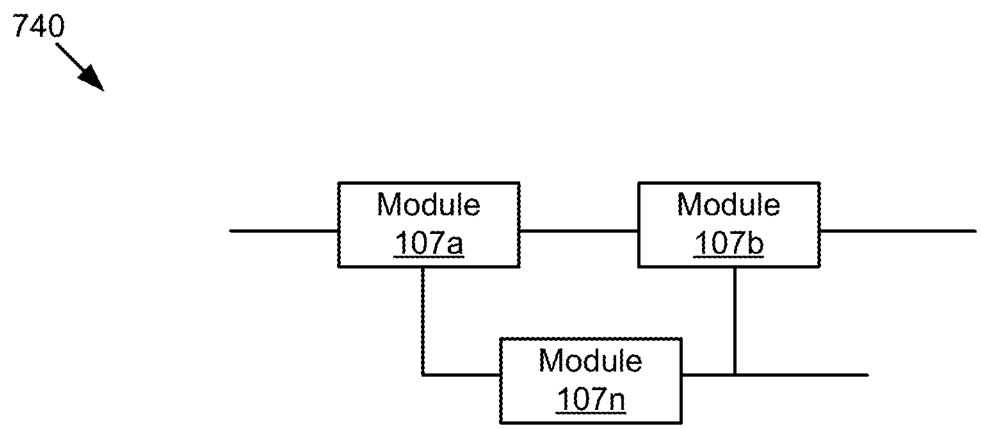
FIG. 7C is a graphic representation illustrating example software code including multiple code modules.

FIG. 7C is a graphic representation 740 illustrating example software code including multiple code modules 107*a*, 107*b* . . . 107*n*.

Example Statistics

In some implementations, to evaluate the performance of various static analysis tools 117*a*, 117*b* . . . 117*n*, test suites were created in which several software defects were implemented intentionally. FIG. 15 depicts example implementable software defects by classification that should be detectable by the analysis tools 117. Eight approximate example classifications are included, e.g., static memory defects, dynamic memory defects, etc. Top-level defect type classifications are listed in the left-most column of the table depicted in FIG. 15. Each defect type has more detailed subtypes, e.g., static memory defects can be sub-classified as static buffer overrun and static buffer underrun. These subtypes are listed in the second and third columns of the same table (details have been omitted for the purposes of brevity). In the depicted example, the number of the subtypes is 39.

In this example, each defect subtype has two-step variations. There are two variations of codebases in the first step: codebases with defects and codebases without defects. Codebases with defects can be used for evaluating true positives and false negatives from the test case (test suite) analysis results. Codebases without defects can be used for evaluating true negatives and false positives. In the second step, further codebase variations are created in each defect subtype in both cases (with defects and without defects), e.g., single or multiple memory area(s), single or multiple function(s), etc. The statistics of these variations are listed in the two right-most columns in the same table. For example, the codebases with defects that correspond to the static buffer defects include 62 variants in total considering the two subtypes.

FIG. 16 illustrates example evaluation criteria of test suite analysis results. The rates listed in the fourth column of the table depicted in FIG. 16 may be calculated based on the defects listed in Table 15. In this present example, lower values for false positive and negative rates are better, and for other rates, high values are better. In some cases, the false negative rate and the proven rate can be applied only to absence-validating semantics-based static analysis tools 117 because they can prove the absence of defects in theory while other tools such as the absence-agnostic static analysis tools may not be configured to provide the same analysis. The right-most column in the same table lists the acronyms corresponding to these rates.

Figure 8B:
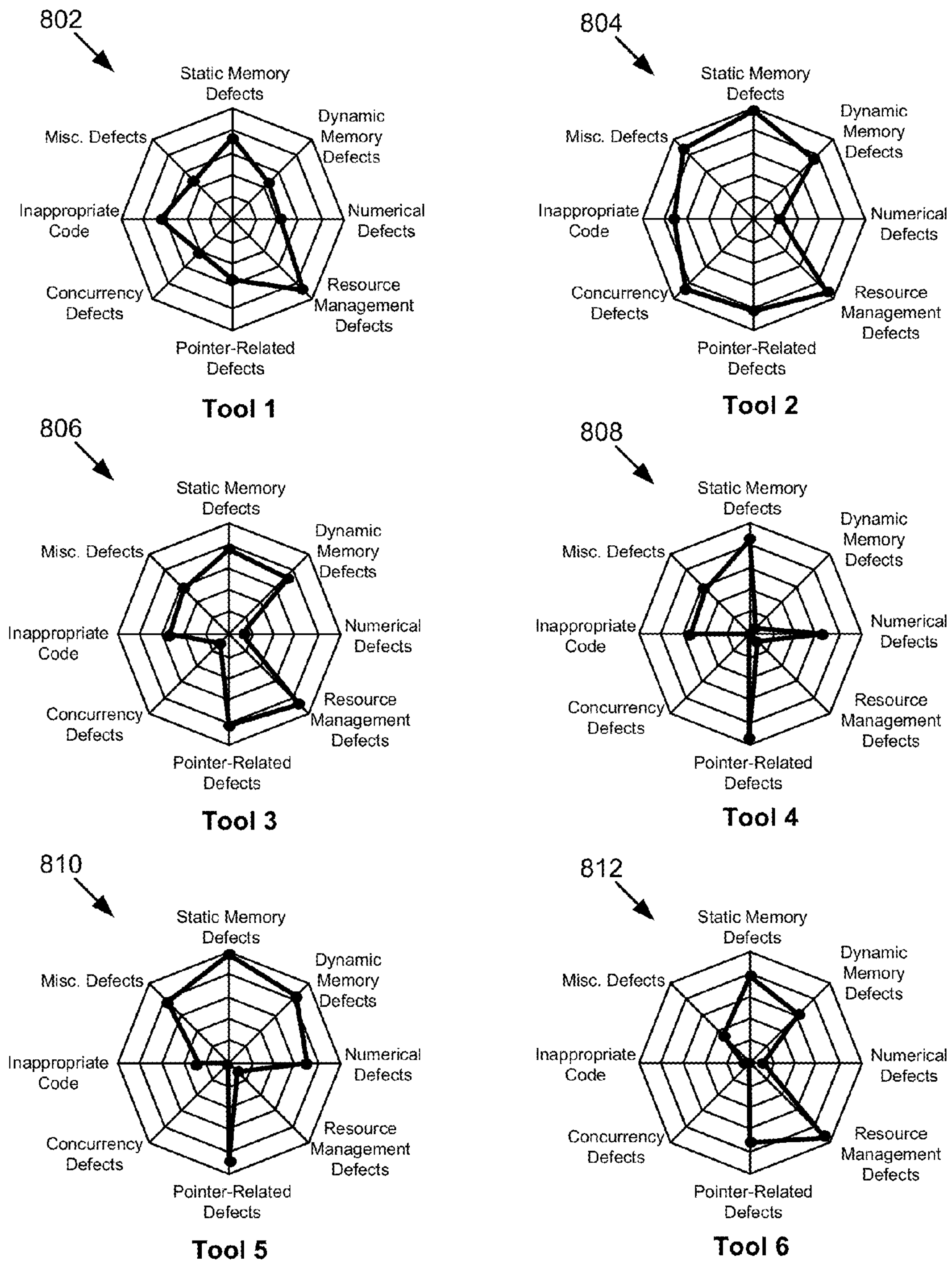
Figure 8C:
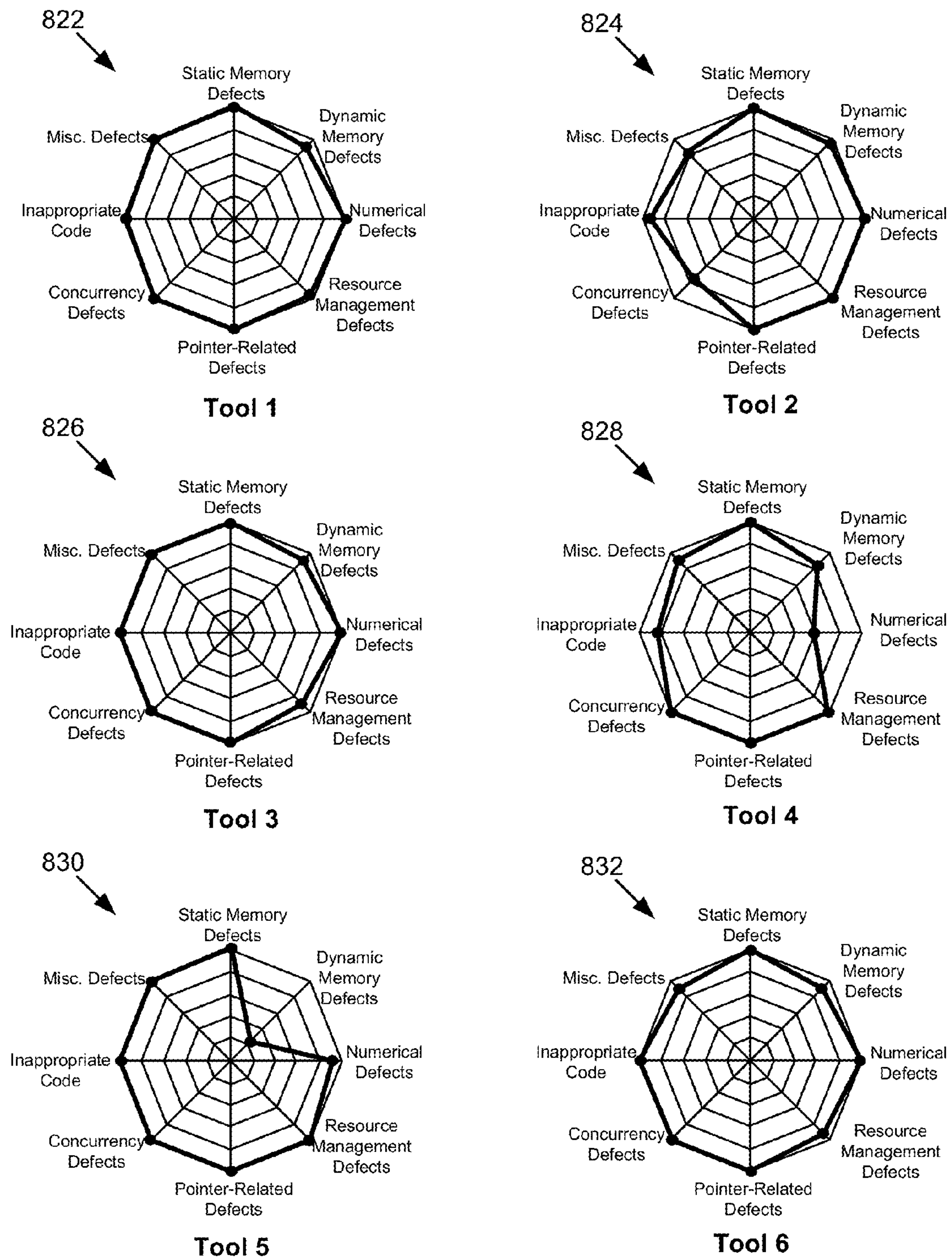
Figure 9A:
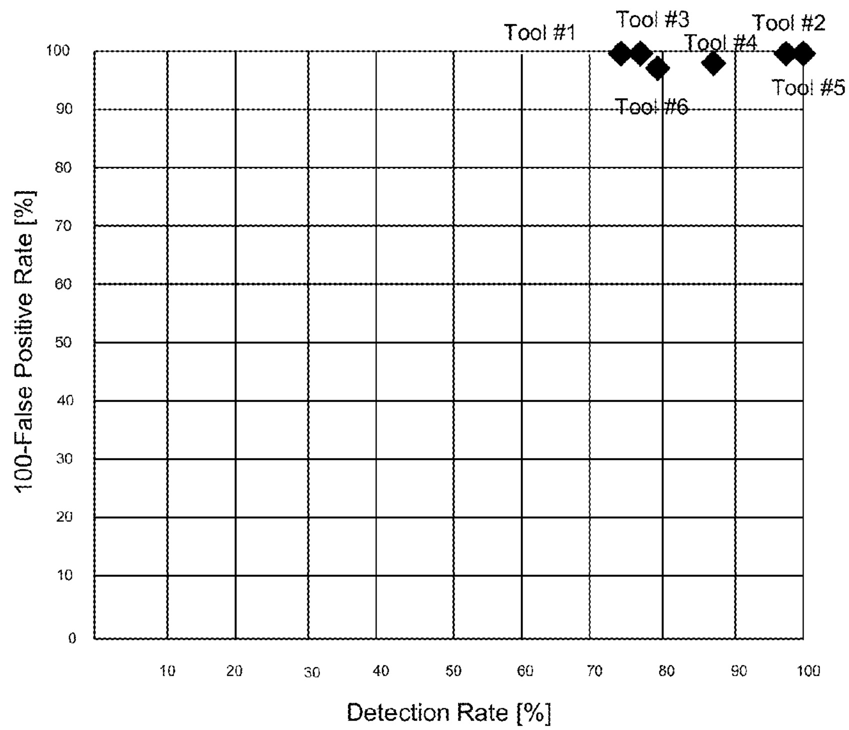
FIGS. 9A-9I are graphs illustrating example analysis tool defect detection rate statistics.
Figure 9B:
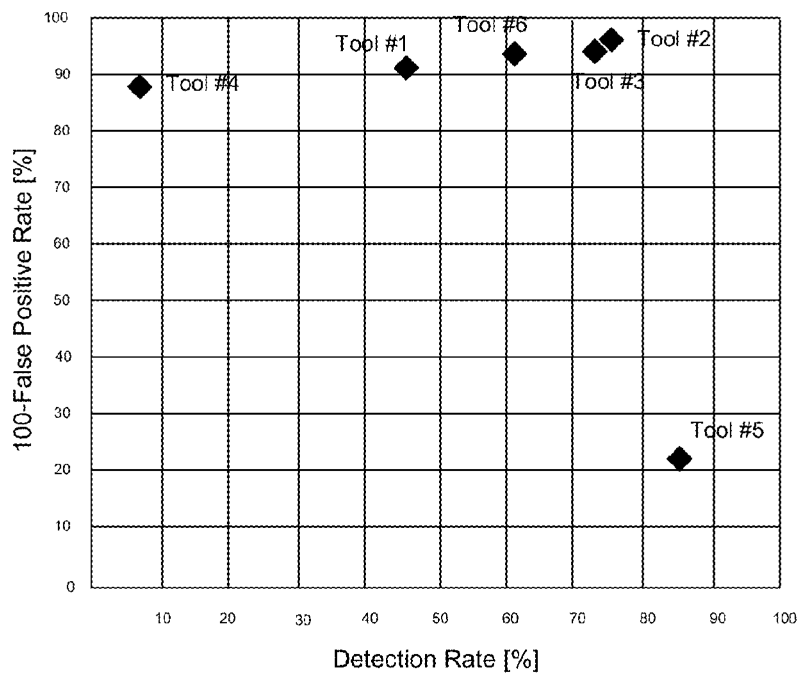
Figure 9C:
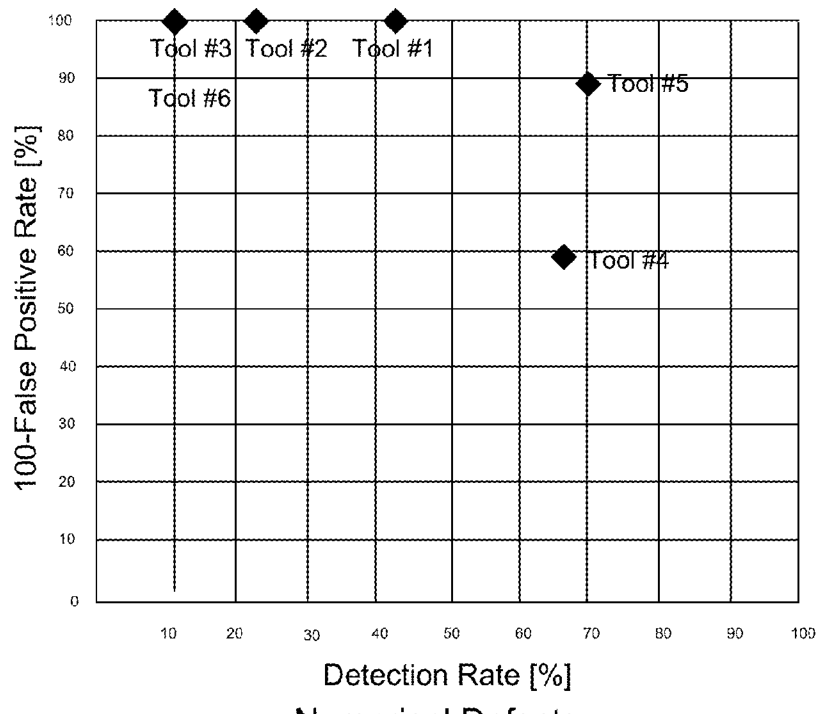
Figure 9D:
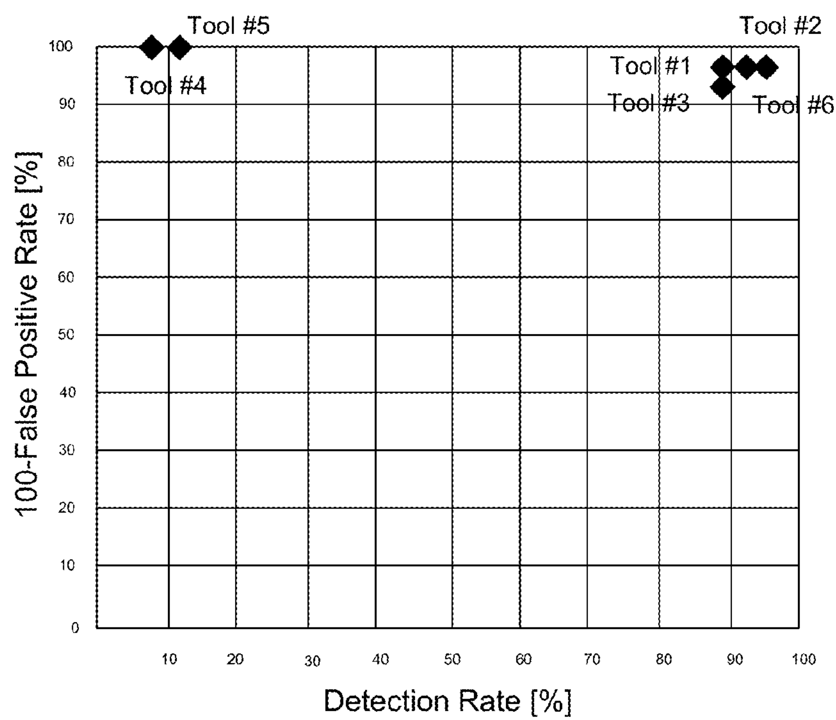
Figure 9E:
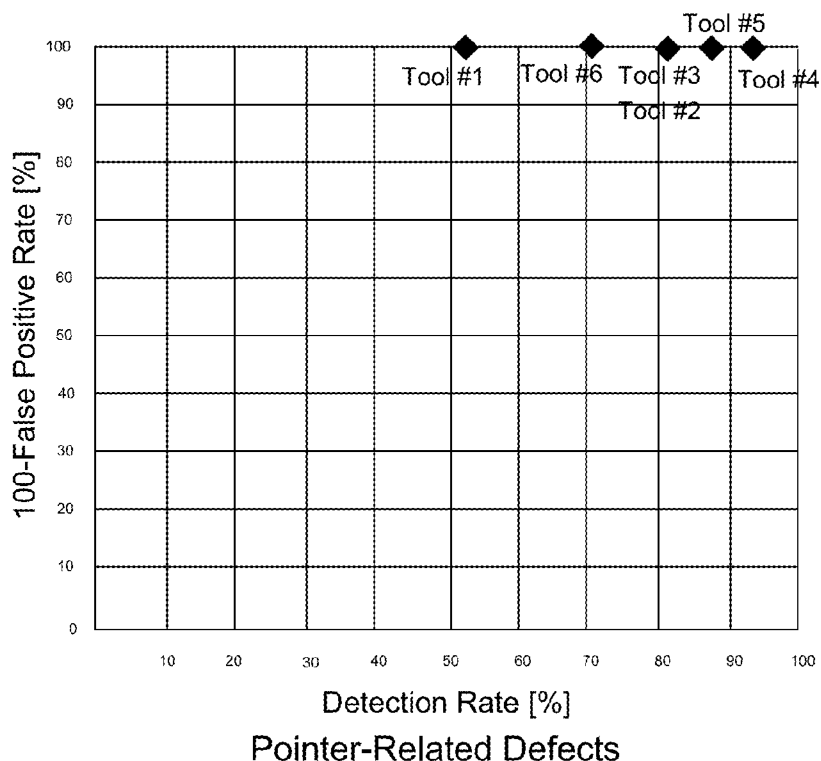
Figure 9F:
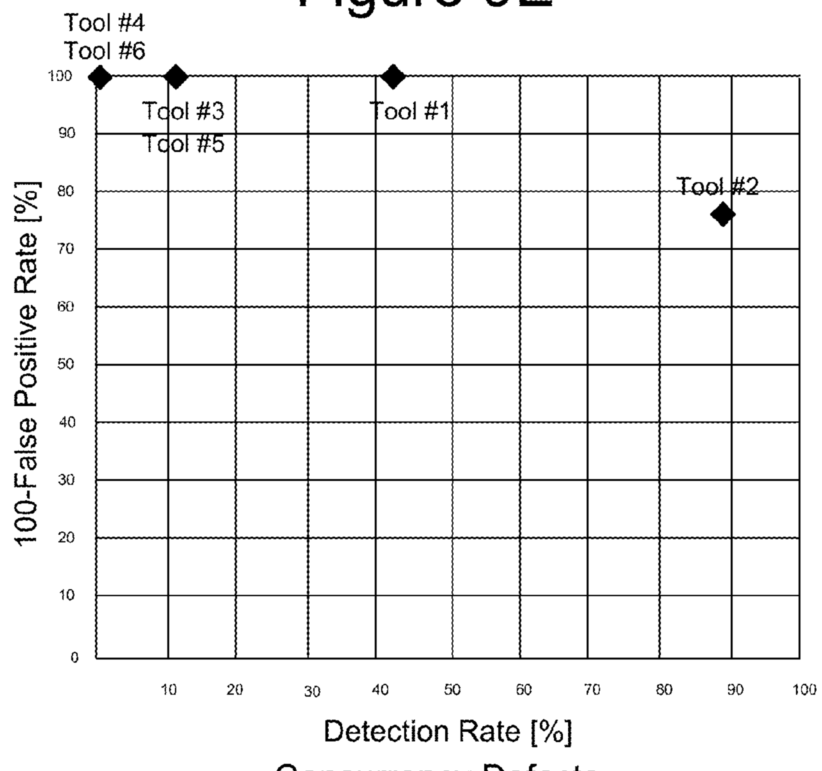
Figure 9G:
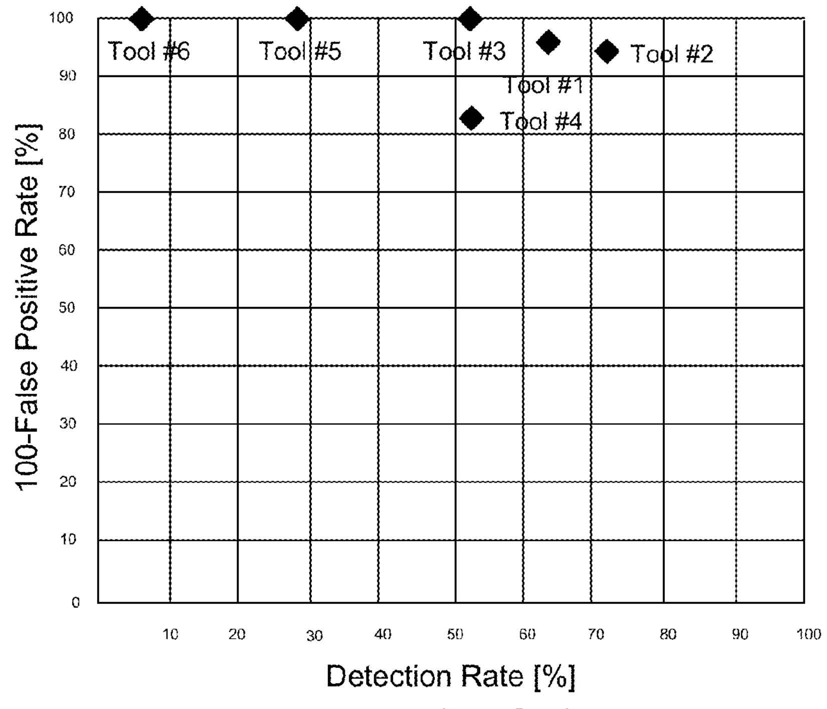
Figure 9H:
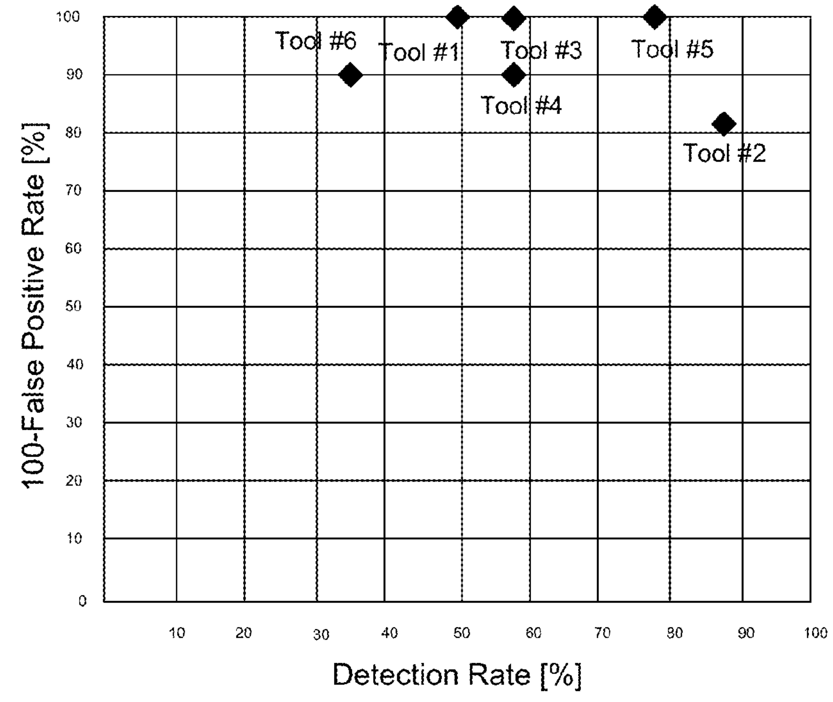
Figure 9I:
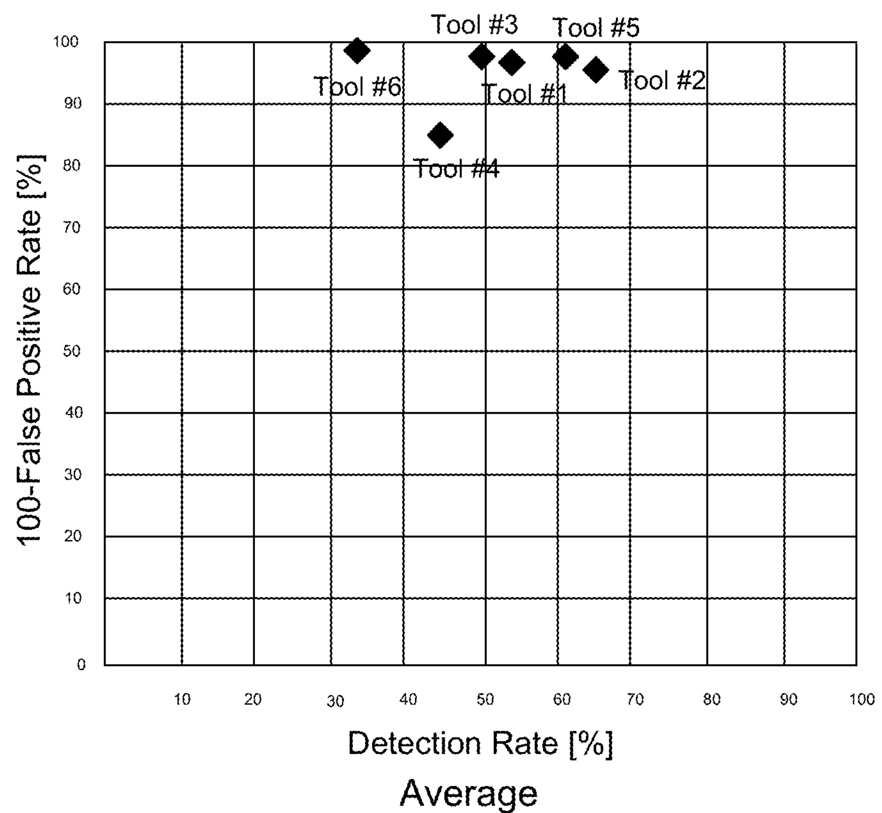

FIGS. 8A-8C are data representations related to example analysis tool performance statistics. In Particular, FIG. 8A summarizes the statistics generated from the test suite analysis results of six tools, where tools 5 and 6 are absence-validating semantics-based tools, and the others are absence-agnostic semantic-based tools. Among the tools depicted in the table in FIG. 8A, the tool having the best (highest) detection rate for each defect type is highlighted (bolded, underlined). For example, for static memory defects, tool 5 has the best detection rate (DR), i.e., 100%.

The graphs 802, 804, 806, 808, 810, and 812 in FIG. 8B show the various defect detection rates by defect type for each of the tools 1-6. In particular, these graphs illustrate the various attributes (e.g., strengths and weaknesses) of each static analysis tool, such as which analysis tools detect the various different defect types the best. For example, tool 2 is the best tool for handling concurrency defects. And, although tool 5 is unable to find concurrency defects, it is proficient at detecting other defects, such as numerical defects. In cases where the highest detection rate in each defect type is needed for minimizing the residual risk of hidden defects, the analysis tools 2, 4, 5, and 6 can be collectively used in the implementations described herein.

The graphs 822, 824, 826, 828, 830, and 832 in FIG. 8C show the various false positive rates by defect type for each of the tools 1-6. In these graphs, 100-FPR (False Positive Rate) is used instead of FPR for better readability (e.g., under a "higher is the better" presumption). In these graphs, we can see that all tools show relatively good performance (low false positive rates), with the exception of numerical defects for tool 4 and dynamic memory defects for tool 5.

Continuing this example, to determine which tools are the most productive and provide the highest level of confidence, the rate module 206 may compute these metrics based on using the following equations.

$$ME\#1\ \text{Productivity}=\sqrt{DR\times(100-FPR)},\qquad(1)$$

$$ME\#2\ \text{Confidence}=\sqrt{PR\times(100-FNR)}.\qquad(2)$$

Regarding ME#1, if the absence-agnostic semantics-based tools exist, they can detect all defects in codebases (e.g., source codes) without including false positive in the analysis results. If absence-validating semantics-based tools exist, in addition the productivity metric ME#1, the rate module 206 could also determine a confidence metric of 100% by validating the absence of defects in all defect-free codebases without generating any false negatives.

FIGS. 9A-9I are graphs illustrating example analysis tool defect detection rate statistics. In particular, FIGS. 9A-9H show a comparison of the productivity metrics by defect type for the six tools discussed above and FIG. 9I shows productivity based on the averaged DR and FPR, which are calculated from the statistics that span all defect types. In the graphs, the tools are plotted based on DR (Detection Rate) versus 100-FPR (False Positive Rate). A given tool can achieve a higher value of ME#1 if it approaches the coordinates (100; 100). For static memory defects, all tools show similar performance.

Figure 17:
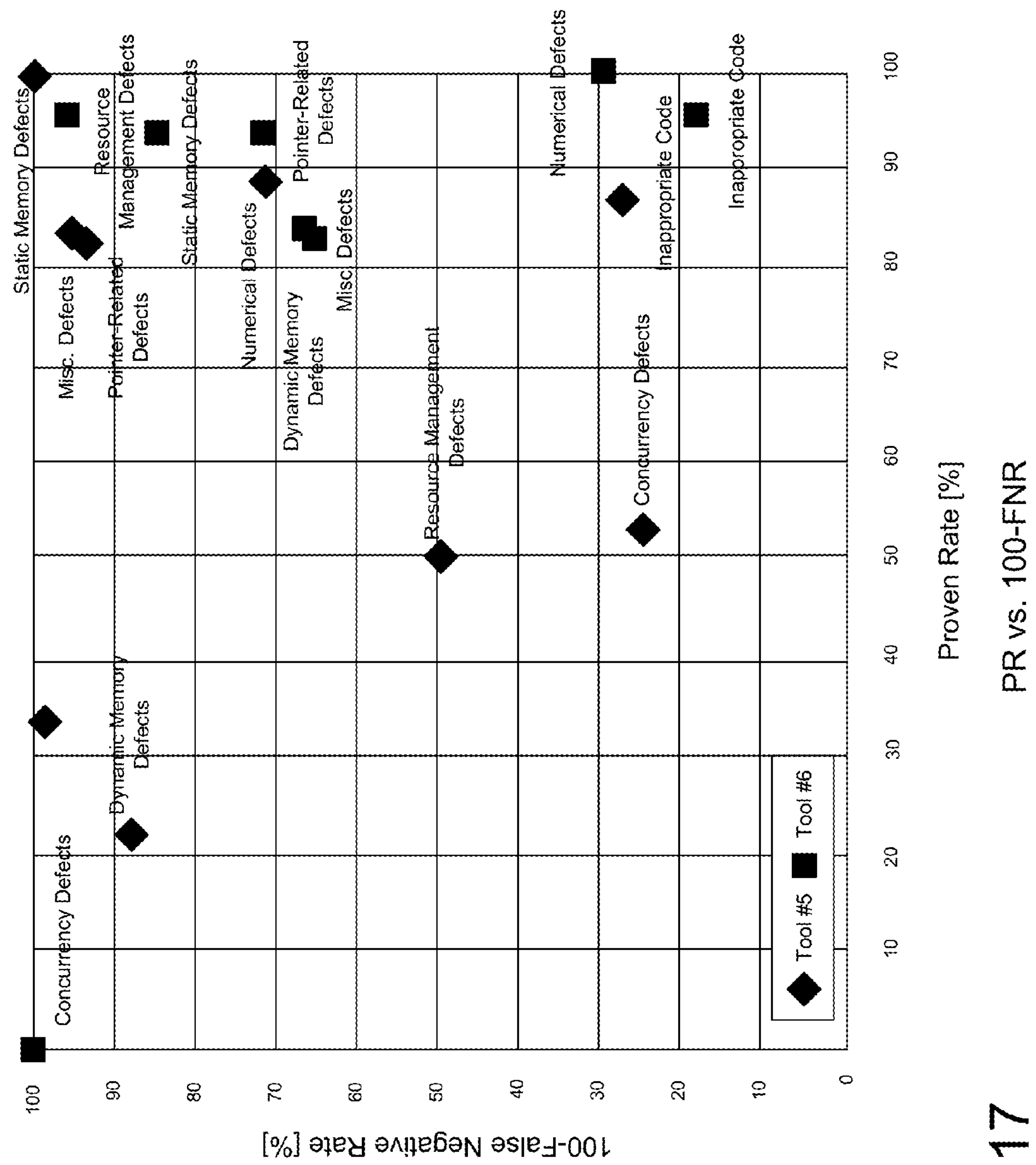
FIG. 17 is a graph illustrating example analysis tool confidence statistics.

FIGS. 10-11 are tables providing example analysis tool productivity and confidence statistics and FIG. 17 is a graph illustrating example analysis tool confidence statistics. More specifically, the table in FIG. 10 indicates the three best tools from a productivity viewpoint for different defect types. In some cases, a single tool may not be sufficient because the best tools may be different for different defect types, such as tool 2, tool 4, tool 5, and tool 6.

FIG. 17 shows a comparison of the confidence metrics of tools 5 and 6 for different defect types. In this graph, the x- and y-axes represent PR (Proven Rate) and 100-FNR (False Negative Rate), respectively. This graph shows that a tool can obtain a higher value of ME#2 if the corresponding rates approach the coordinates (100; 100), and more specifically, that tool 5 suppresses false negatives better than tool 6 while maintaining high proven rates.

The table in FIG. 11 indicates the best absence-validating semantics-based analysis tool from a confidence viewpoint for different defect types. It can be inferred from the table that tool 6 may perform better only for dynamic memory defects and resource management defects. For the other six defect types, tool 5 may be the best tool from a confidence viewpoint.

Figure 12:
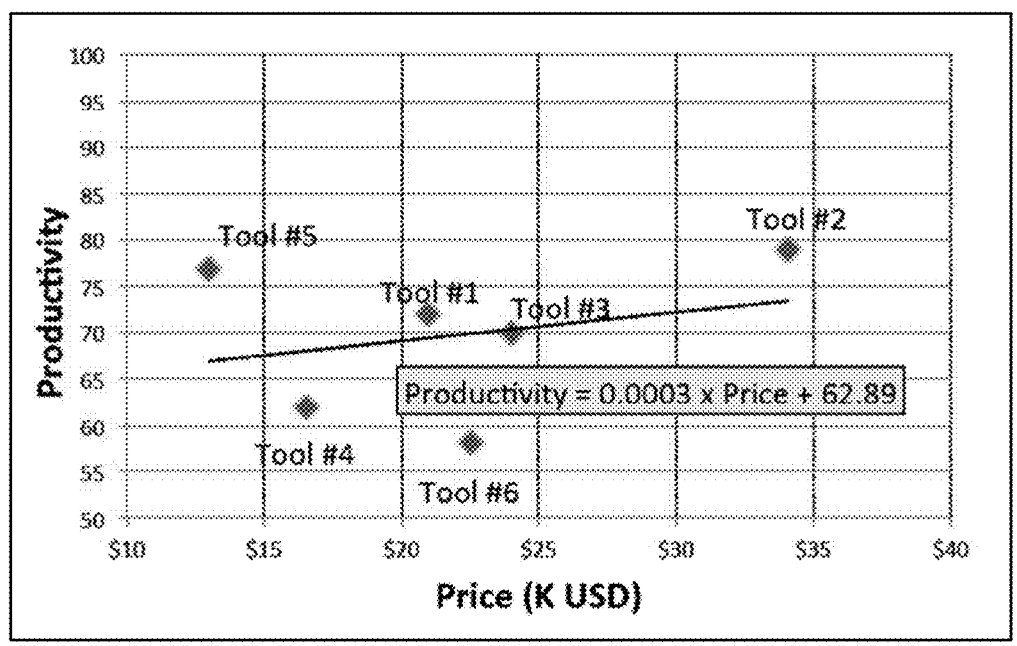
FIG. 12 is a graph illustrating example analysis tool efficiency statistics.

To determine which tools are the most efficient, the rate module 206 can combine the productivity information with the pricing information of the tools. FIG. 12 is a graph illustrating example analysis tool efficiency statistics and FIGS. 13-14 are tables providing example analysis tool efficiency statistics. The graph in FIG. 12 shows the relationship between the averaged productivity shown in FIG. 9(I) versus the prices listed in table of FIG. 13. The table in FIG. 13 lists the prices of the tools 1-6 along with the different licensing policies of the tools. The rate module 206 may produce a trend line obtained by linear regression analysis, which shows that tools, 1, 2, and 5 provide a better than average efficiency.

The rate module 206 may calculate the efficiency metrics for the tools, which may represent each tool's "return of investment," using the following equations:

$$\text{Productivity}=0.0003\times\text{Price}+62.89\qquad(3),$$

where 62.89 is an offset, and $$ME\#3\ \text{Efficiency}=\frac{\text{Productivity}-\text{Offset}}{\text{Price}}.\qquad(4)$$

The table in FIG. 14 depicts an efficiency ranking obtained by combining equations (3), (4), and the data from FIG. 12. In this table, tool 5 has outstanding efficiency compared with the other tools.

In the above description, for purposes of explanation, numerous specific details are set forth in order to provide a thorough understanding of the specification. It should be understood, however, that the disclosure can be practiced without these specific details. In some embodiments, structures and devices are shown in block diagram form in order to avoid obscuring the description. For example, various embodiments are described primarily with reference to user interfaces and particular hardware. However, the embodiments apply to any type of computing device that can receive data and commands, and any peripheral devices providing services.

Reference in the specification to "an embodiment" or "some embodiments" means that a particular feature, structure, or characteristic described in connection with the embodiment(s) is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented networked method comprising:

storing one or more fault-free software codes in a code database;

generating one or more intentional faulty software codes by intentionally inserting one or more different types of faults in the one or more fault-free software codes in the code database;

generating verified data reflecting, for each line in the one or more intentional faulty software codes, whether the line is one of a fault-free or a faulty line;

determining a falseness rate including a false positive rate and a false negative rate for each analysis tool of two or more analysis tools by at least analyzing the one or more intentional faulty software codes with the analysis tool, and comparing an output of the analysis tool with the verified data to determine the falseness rate for the analysis tool;

analyzing software code using the two or more analysis tools to generate two or more tool-output results, the two or more tool-output results including one or more faults and one or more validations identified by at least one of the two or more analysis tools;

generating an analysis result based on the two or more tool-output results, the analysis result characterizing the one or more faults and the one or more validations identified by at least one of the two or more analysis tools;

determining a fault expectation for the software code based on at least 1) the falseness rate including the false positive rate and the false negative rate associated with each analysis tool of the two or more analysis tools, and 2) the analysis result characterizing the one or more faults and the one or more validations identified by the at least one of the two or more analysis tools; and performing a quality assurance analysis for the software code based on the fault expectation.

2. The method of claim 1, wherein the fault expectation includes an expectation of a number of faults.

3. The method of claim 1, wherein the fault expectation includes an expectation of a fault density.

4. The method of claim 1, wherein determining the fault expectation and performing quality assurance analysis for the software code are performed in an implementation phase of software development.

5. A computer-implemented method, comprising:

determining a falseness rate including a false positive rate and a false negative rate for each analysis tool of two or more analysis tools by at least analyzing one or more intentional faulty software codes with the analysis tool, and comparing an output of the analysis tool with verified data to determine the falseness rate for the analysis tool;

analyzing software code using the two or more analysis tools to generate two or more tool-output results, the two or more tool-output results including one or more faults and one or more validations identified by at least one of the two or more analysis tools;

generating an analysis result based on the two or more tool-output results by at least identifying, from the two or more analysis tools and the two or more tool-output results, a first set of tools that each identifies at least one of the faults in a line of code included in the software code, identifying, from the two or more analysis tools and the two or more tool-output results, a second set of tools that each validates the line of code as fault-free, determining a number of faults identified in the line of code, determining a number of tools included in the first set of tools, and determining a number of tools included in the second set of tools, the analysis result including the number of faults in the line of code, the number of tools included in the first set of tools, and the number of tools included in the second set of tools;

determining a fault expectation for the software code based on at least 1) the falseness rate including the false positive rate and the false negative rate associated with each analysis tool of the two or more analysis tools, and 2) the analysis result; and performing a quality assurance analysis for the software code based on the fault expectation.

6. A computer-implemented method, comprising:

determining a falseness rate including a false positive rate and a false negative rate for each analysis tool of two or more analysis tools by at least analyzing one or more intentional faulty software codes with the analysis tool, and comparing an output of the analysis tool with verified data to determine the falseness rate for the analysis tool;

analyzing software code using the two or more analysis tools to generate two or more tool-output results, the two or more tool-output results including one or more faults and one or more validations identified by at least one of the two or more analysis tools;

generating an analysis result based on the two or more tool-output results by at least determining a number of lines in a code module included in the software code, determining a number of faults identified by the two or more analysis tools for the code module from the two or more tool-output results, identifying, from the two or more analysis tools and the two or more tool-output results, a number of analysis tools that each identify at least one of the faults, and identifying, from the two or more analysis tools and the two or more tool-output results, a number of analysis tools that each validate the code module to be fault-free, the analysis result including the number of lines included in the code module, the number of faults identified by the two or more analysis tools for the code module, the number of analysis tools that each identify at least one of the faults, and the number of analysis tools that each validate the code module to be fault-free;

determining a fault expectation for the software code based on at least 1) the falseness rate including the false positive rate and the false negative rate associated with each analysis tool of the two or more analysis tools, and 2) the analysis result; and performing a quality assurance analysis for the software code based on the fault expectation.

7. A computer program product comprising a non-transitory computer usable medium including a computer readable program, wherein the computer readable program when executed on a computer causes the computer to:

store one or more fault-free software codes in a code database;

generate one or more intentional faulty software codes by intentionally inserting one or more different types of faults in the one or more fault-free software codes in the code database;

generate verified data reflecting, for each line in the one or more intentional faulty software codes, whether the line is one of a fault-free or a faulty line;

determine a falseness rate including a false positive rate and a false negative rate for each analysis tool of two or more analysis tools by at least analyzing the one or more intentional faulty software codes with the analysis tool, and comparing an output of the analysis tool with the verified data to determine the falseness rate for the analysis tool;

analyze software code using the two or more analysis tools to generate two or more tool-output results, the two or more tool-output results including one or more faults and one or more validations of the software code identified by at least one of the two or more analysis tools;

generate an analysis result based on the two or more tool-output results, the analysis result characterizing the one or more faults and the one or more validations identified by at least one of the two or more analysis tools;

determine a fault expectation for the software code based on at least 1) the falseness rate including the false positive rate and the false negative rate associated with each analysis tool of the two or more analysis tools, and 2) the analysis result characterizing the one or more faults and the one or more validations identified by the at least one of the two or more analysis tools; and perform a quality assurance analysis for the software code based on the fault expectation.

8. The computer program product of claim 7, wherein the fault expectation includes an expectation of a number of faults.

9. The computer program product of claim 7, wherein the fault expectation includes an expectation of a fault density.

10. The computer program product of claim 7, wherein determining the fault expectation and performing quality assurance analysis for the software code are performed in an implementation phase of software development.

11. A computer program product comprising a non-transitory computer usable medium including a computer readable program, wherein the computer readable program when executed on a computer causes the computer to:

determine a falseness rate including a false positive rate and a false negative rate for each analysis tool of two or more analysis tools by at least analyzing one or more intentional faulty software codes with the analysis tool, and comparing an output of the analysis tool with verified data to determine the falseness rate for the analysis tool;

analyze software code using the two or more analysis tools to generate two or more tool-output results, the two or more tool-output results including one or more faults and one or more validations identified by at least one of the two or more analysis tools;

generate an analysis result based on the two or more tool-output results by at least identifying, from the two or more analysis tools and the two or more tool-output results, a first set of tools that each identifies at least one of the faults in a line of code included in the software code, identifying, from the two or more analysis tools and the two or more tool-output results, a second set of tools that each validates the line of code as fault-free, determining a number of faults identified in the line of code, determining a number of tools included in the first set of tools, and determining a number of tools included in the second set of tools, the analysis result including the number of faults in the line of code, the number of tools included in the first set of tools, and the number of tools included in the second set of tools;

determine a fault expectation for the software code based on at least 1) the falseness rate including the false positive rate and the false negative rate associated with each analysis tool of the two or more analysis tools, and 2) the analysis result; and perform a quality assurance analysis for the software code based on the fault expectation.

12. A computer program product comprising a non-transitory computer usable medium including a computer readable program, wherein the computer readable program when executed on a computer causes the computer to:

determine a falseness rate including a false positive rate and a false negative rate for each analysis tool of two or more analysis tools by at least analyzing one or more intentional faulty software codes with the analysis tool, and comparing an output of the analysis tool with verified data to determine the falseness rate for the analysis tool;

analyze software code using the two or more analysis tools to generate two or more tool-output results, the two or more tool-output results including one or more faults and one or more validations identified by at least one of the two or more analysis tools;

generate an analysis result based on the two or more tool-output results by at least determining a number of lines in a code module included in the software code, determining a number of faults identified by the two or more analysis tools for the code module from the two or more tool-output results, identifying, from the two or more analysis tools and the two or more tool-output results, a number of analysis tools that each identify at least one of the faults, and identifying, from the two or more analysis tools and the two or more tool-output results, a number of analysis tools that each validate the code module to be fault-free, the analysis result including the number of lines included in the code module, the number of faults identified by the two or more analysis tools for the code module, the number of analysis tools that each identify at least one of the faults, and the number of analysis tools that each validate the code module to be fault-free;

determine a fault expectation for the software code based on at least 1) the falseness rate including the false positive rate and the false negative rate associated with each analysis tool of the two or more analysis tools, and 2) the analysis result; and perform a quality assurance analysis for the software code based on the fault expectation.

13. A system comprising:

a processor; and a memory storing instructions that, when executed, cause the system to:

store one or more fault-free software codes in a code database;

generate one or more intentional faulty software codes by intentionally inserting one or more different types of faults in the one or more fault-free software codes in the code database;

generate verified data reflecting, for each line in the one or more intentional faulty software codes, whether the line is one of a fault-free or a faulty line;

determine a falseness rate including a false positive rate and a false negative rate for each analysis tool of two or more analysis tools by at least analyzing the one or more intentional faulty software codes with the analysis tool, and comparing an output of the analysis tool with the verified data to determine the falseness rate for the analysis tool;

analyze software code using the two or more analysis tools to generate two or more tool-output results, the two or more tool-output results including one or more faults and one or more validations of the software code identified by at least one of the two or more analysis tools;

generate an analysis result based on the two or more tool-output results, the analysis result characterizing the one or more faults and the one or more validations identified by at least one of the two or more analysis tools;

determine a fault expectation for the software code based on at least 1) the falseness rate including the false positive rate and the false negative rate associated with each analysis tool of the two or more analysis tools, and 2) the analysis result characterizing the one or more faults and the one or more validations identified by the at least one of the two or more analysis tools; and perform a quality assurance analysis for the software code based on the fault expectation.

14. The system of claim 13, wherein the fault expectation includes an expectation of a number of faults.

15. The system of claim 13, wherein the fault expectation includes an expectation of a fault density.

16. A system comprising:

a processor; and a memory storing instructions that, when executed, cause the system to:

determine a falseness rate including a false positive rate and a false negative rate for each analysis tool of two or more analysis tools by at least analyzing one or more intentional faulty software codes with the analysis tool, and comparing an output of the analysis tool with verified data to determine the falseness rate for the analysis tool;

analyze software code using the two or more analysis tools to generate two or more tool-output results, the two or more tool-output results including one or more faults and one or more validations of the software code identified by at least one of the two or more analysis tools;

generate an analysis result based on the two or more tool-output results by at least identifying, from the two or more analysis tools and the two or more tool-output results, a first set of tools that each identifies at least one of the faults in a line of code included in the software code, identifying, from the two or more analysis tools and the two or more tool-output results, a second set of tools that each validates the line of code as fault-free, determining a number of faults identified in the line of code, determining a number of tools included in the first set of tools, and determining a number of tools included in the second set of tools, the analysis result including the number of faults in the line of code, the number of tools included in the first set of tools, and the number of tools included in the second set of tools;

determine a fault expectation for the software code based on at least 1) the falseness rate including the false positive rate and the false negative rate associated with each analysis tool of the two or more analysis tools, and 2) the analysis result; and perform a quality assurance analysis for the software code based on the fault expectation.

17. A system comprising:

a processor; and a memory storing instructions that, when executed, cause the system to:

determine a falseness rate including a false positive rate and a false negative rate for each analysis tool of two or more analysis tools by at least analyzing one or more intentional faulty software codes with the analysis tool, and comparing an output of the analysis tool with verified data to determine the falseness rate for the analysis tool;

analyze software code using the two or more analysis tools to generate two or more tool-output results, the two or more tool-output results including one or more faults and one or more validations of the software code identified by at least one of the two or more analysis tools;

generate an analysis result based on the two or more tool-output results by at least determining a number of lines in a code module included in the software code, determining a number of faults identified by the two or more analysis tools for the code module from the two or more tool-output results, identifying, from the two or more analysis tools and the two or more tool-output results, a number of analysis tools that each identify at least one of the faults, and identifying, from the two or more analysis tools and the two or more tool-output results, a number of analysis tools that each validate the code module to be fault-free, the analysis result including the number of lines included in the code module, the number of faults identified by the two or more analysis tools for the code module, the number of analysis tools that each identify at least one of the faults, and the number of analysis tools that each validate the code module to be fault-free;

determine a fault expectation for the software code based on at least 1) the falseness rate including the false positive rate and the false negative rate associated with each analysis tool of the two or more analysis tools, and 2) the analysis result; and perform a quality assurance analysis for the software code based on the fault expectation.

* * * * *